US011137807B2

(12) United States Patent
Ahuja et al.

(10) Patent No.: US 11,137,807 B2
(45) Date of Patent: Oct. 5, 2021

(54) SYSTEM, APPARATUS AND METHOD FOR CONTROLLABLE PROCESSOR CONFIGURATION BASED ON A TEMPERATURE SPECIFICATION

(71) Applicant: Intel Corporation, Santa Clara, CA (US)

(72) Inventors: Sandeep Ahuja, Portland, OR (US); Nikhil Gupta, Portland, OR (US); Vasudevan Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 15/938,291

(22) Filed: Mar. 28, 2018

(65) Prior Publication Data

US 2019/0041925 A1 Feb. 7, 2019

(51) Int. Cl.
*G06F 1/20* (2006.01)
*G06F 1/32* (2019.01)
*G06F 1/324* (2019.01)
*G06F 1/3296* (2019.01)

(52) U.S. Cl.
CPC .............. *G06F 1/206* (2013.01); *G06F 1/324* (2013.01); *G06F 1/3296* (2013.01)

(58) Field of Classification Search
None
See application file for complete search history.

(56) References Cited

U.S. PATENT DOCUMENTS

| 7,036,030 | B1 * | 4/2006 | Altmejd | G06F 1/3228 713/322 |
| 7,225,100 | B2 * | 5/2007 | Gaskins | G06F 1/206 702/132 |
| 7,464,277 | B2 * | 12/2008 | Prosperi | G06F 1/206 713/320 |
| 9,116,050 | B2 | 8/2015 | Ahuja et al. | |

(Continued)

FOREIGN PATENT DOCUMENTS

WO 2016130282 8/2016

OTHER PUBLICATIONS

International Searching Authority, "Notification of Transmittal of the International Search Report and the Written Opinion of the International Searching Authority," dated Jun. 5, 2019, in International application No. PCT/US2019/019946.

*Primary Examiner* — Jaweed A Abbaszadeh
*Assistant Examiner* — Cheri L Harrington
(74) *Attorney, Agent, or Firm* — Trop Pruner & Hu, P.C.

(57) ABSTRACT

In one embodiment, a processor includes a non-volatile storage to store a plurality of configurations for the processor, the non-volatile storage including a plurality of entries to store configuration information for the processor for one of the plurality of configurations, the configuration information including at least one of a guaranteed operating frequency and a core count, at least one of the entries to store the core count. The processor further includes a power controller to control the processor to operate at one of the plurality of configurations based at least in part on a selected thermal set point of a plurality of thermal set points of the processor, each of the plurality of thermal set points associated with one of the configurations. Other embodiments are described and claimed.

20 Claims, 18 Drawing Sheets

(56) References Cited

U.S. PATENT DOCUMENTS

| | | | | |
|---|---|---|---|---|
| 9,465,418 B2* | 10/2016 | Shah | | G06F 1/206 |
| 9,710,030 B2* | 7/2017 | Shah | | G06F 1/206 |
| 10,488,899 B2* | 11/2019 | Shah | | G06F 1/206 |
| 2004/0215748 A1* | 10/2004 | Boonie | | G06F 9/5011 |
| | | | | 709/220 |
| 2008/0001634 A1* | 1/2008 | Arabi | | G06F 1/206 |
| | | | | 326/99 |
| 2009/0089543 A1* | 4/2009 | Gunther | | G06F 9/30181 |
| | | | | 712/30 |
| 2010/0332799 A1* | 12/2010 | Sonobe | | G06F 1/206 |
| | | | | 712/43 |
| 2013/0007440 A1* | 1/2013 | Shah | | G06F 1/206 |
| | | | | 713/100 |
| 2014/0173151 A1 | 6/2014 | Guddeti et al. | | |
| 2014/0281445 A1 | 9/2014 | Varma et al. | | |
| 2015/0100799 A1* | 4/2015 | Shah | | G06F 1/206 |
| | | | | 713/300 |
| 2015/0100800 A1* | 4/2015 | Shah | | G06F 1/26 |
| | | | | 713/300 |
| 2015/0234450 A1* | 8/2015 | Lin | | G06F 1/26 |
| | | | | 713/323 |
| 2015/0347203 A1* | 12/2015 | Yang | | G06F 9/5094 |
| | | | | 719/318 |
| 2016/0179158 A1* | 6/2016 | Thomas | | G06F 1/206 |
| | | | | 713/340 |
| 2016/0179180 A1* | 6/2016 | Gupta | | H04W 52/0296 |
| | | | | 713/323 |
| 2016/0239074 A1* | 8/2016 | Lee | | G06F 1/3225 |
| 2017/0031418 A1* | 2/2017 | Allen-Ware | | G06F 1/3243 |
| 2017/0068261 A1* | 3/2017 | Hsu | | G05D 23/1917 |
| 2017/0123467 A1 | 5/2017 | Ignowski et al. | | |
| 2017/0147048 A1* | 5/2017 | Park | | G06F 1/324 |
| 2017/0230251 A1* | 8/2017 | Dube | | H04L 41/042 |
| 2017/0285699 A1 | 10/2017 | Ahuja et al. | | |
| 2017/0322616 A1* | 11/2017 | Hsiao | | G06F 1/324 |
| 2018/0039322 A1 | 2/2018 | Weissmann et al. | | |
| 2018/0067892 A1 | 3/2018 | Varma et al. | | |
| 2018/0167878 A1* | 6/2018 | Lee | | H04W 52/029 |
| 2018/0267566 A1* | 9/2018 | Locke | | G05D 23/1919 |

* cited by examiner

SYSTEM, APPARATUS AND METHOD FOR CONTROLLABLE PROCESSOR CONFIGURATION BASED ON A TEMPERATURE SPECIFICATION

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
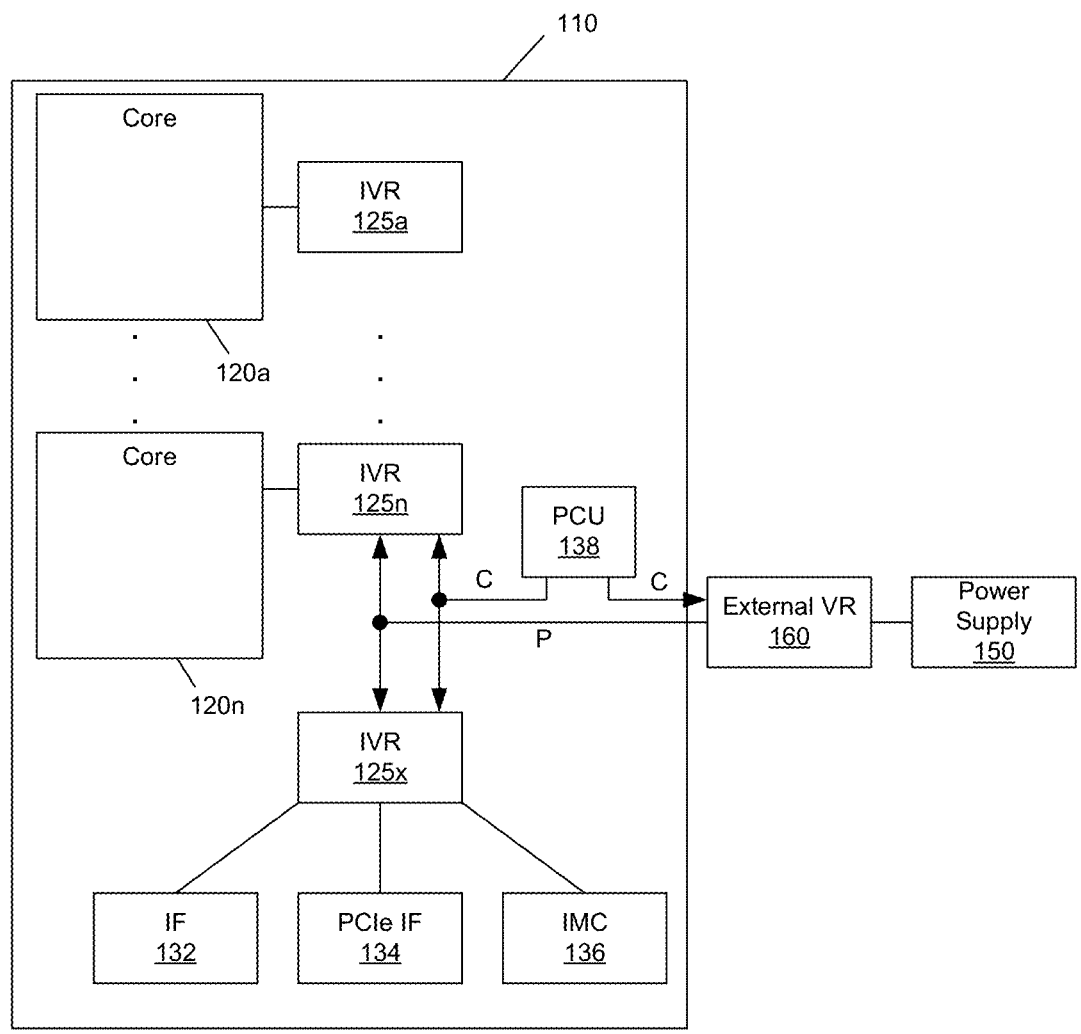
FIG. 1 is a block diagram of a portion of a system in accordance with an embodiment of the present invention.

In various embodiments, a processor may be provided with multiple configurations. Each such configuration may include various operating parameters at which the processor is to execute. More specifically as described herein, based upon a temperature specification at which the processor is to operate (which in turn may be dependent upon a particular system configuration in which the processor is located), a given one of these multiple configurations may be identified or selected. When a multi-configuration processor is incorporated in a system that provides relatively cool operating environments, processor operation may be at a higher configuration, such that higher operating parameters, such as guaranteed operating frequency, core counts and so forth may be selected. Instead when the system provides for hotter operation (and thus higher processor temperatures), the processor may operate with a lower configuration, such that lower guaranteed operating frequency and/or core counts, among other operating parameters may occur. In this way, a single processor may be sold having multiple configurations. A given one of these configurations can be statically or dynamically selected, based at least in part on a temperature specification, namely a maximum temperature at which the processor is to operate. In either case (static or dynamic), understand that processor configuration/reconfiguration herein is a long term event. That is, while it is possible for a processor to dynamically adjust configuration based on an instantaneous thermal event, it is understood that a configuration/reconfiguration may be made in light of long term system conditions (e.g., days, weeks, months, years), and not merely due to an instantaneous thermal event.

Note that a processor configuration also may be known as a processor stock keeping unit (SKU), which is a specification of one or more characteristics or capabilities of the processor, as advertised. As such, a customer may purchase a processor having a specific SKU that specifies maximum operating parameters such as temperature, guaranteed operating frequency, power and so forth. Typically, a customer pays more for a SKU having higher capabilities, and conventionally a processor SKU is fixed for a single configuration of these maximum operating parameters.

Instead using an embodiment, a multi-configuration processor, also referred to as a multi-SKU processor, is provided. Depending on operating temperature environment, the processor may operate at a given one of multiple configurations. In this way, a customer having a priori knowledge of maximum operating temperature can specify a desired configuration at which a processor is to operate. For example, where a processor is to be incorporated into a highly dense shadowed 1U system configuration such as a datacenter rack configuration, a first processor configuration may be used. Instead where the processor is incorporated into a better environment (e.g., un-shadowed system configuration, 2U form factor, liquid cooled system, lower ambient temperature), a second, higher processor configuration may be used. As such, embodiments enable a controllable processor configuration based on an environment in which the processor is used.

Note that a higher number of active cores may be particularly desirable in cloud usage models where a cloud service provider can increase revenue generated per server by increasing the number of virtual machines (VMs) on each server with the additional computing cores.

In a reverse scenario, a datacenter operator may find that total cost of ownership (TCO) is lower if the datacenter is operated at higher ambient and uses free air cooling. In this scenario, a conventional single SKU processor would be throttled if the datacenter ambient were to go above a specified temperature, such that eventually, the processor will settle down to a lower frequency and lower power. However in this scenario, a datacenter operator does not know a priori whether such performance loss is going to be acceptable. Similar degraded cooling can also happen during fan failure condition. Without an embodiment, an original equipment manufacturer (OEM) is not able to guarantee a level of performance during such conditions.

When a cooling solution is significantly better than what is assumed for a SKU definition, a processor in accordance with an embodiment may enable a higher guaranteed frequency and/or allow for additional cores to be available. In contrast, when cooling is significantly worse than what is assumed for a standard reference temperature specification, a lower guaranteed operating frequency and/or reduced core counts may be available. In some processor configurations, higher operating temperature may be allowed while keeping the same guaranteed frequency. However, in such configurations, a lower core count is allowed with a lower thermal design power (TDP) to keep the processor within its thermal specification limits.

Using an embodiment, a processor manufacturer may charge a premium for a dynamic or multi-SKU integrated circuit that allows a customer to select a guaranteed level of performance and/or core count (among other operating parameters) based on a given cooling environment. And using an embodiment, an OEM or other customer can differentiate their systems by cooling solutions and associated performance levels. That is, an OEM or other customer can choose between costs of the cooling solution, density of the system versus performance level the processor can deliver. As such, an OEM can provide guaranteed performance when a system is used under American Society of Heating, Refrigeration and Air Conditioning Engineers (ASHRAE) classes (e.g., A1, A2, A3, A4, etc.) and different ASHRAE liquid cooling classes (e.g., W1, W2, W3, W4, etc.).

With a multi-configuration processor, a datacenter operator can choose to run its datacenter hotter when there is less demand for compute capacity (e.g., cyclical variation such as time of year usage models) and even with a lower frequency while compute demand is met. Further, datacenter cooling controls can be safely adjusted to save facility cooling while still meeting compute needs since frequency is guaranteed for a given temperature. On the other hand, compute capacity can be increased by providing better cooling (e.g., lower datacenter ambient, running air conditioning) without adding any additional install capacity. For example, in a liquid cooled datacenter and server, one can decide to run chillers when compute demand increases. By sending chilled liquid to servers, cooling capability and hence guaranteed frequency and/or available number of computing cores can be increased.

In high volume manufacturing (HVM) during class testing, each processor is tested for guaranteed operating frequency at different temperature set points. These temperature and frequency pairs may be stored persistently (e.g., within the processor), to be accessed during operation. That is, in operation this configuration information may be used to form the basis of providing different guaranteed operating frequency levels at different levels of cooling. In addition, at lower thermal operating points, the processor may operate with lower leakage levels.

For example, if a maximum operating temperature (e.g., a maximum junction temperature) ($T_{jmax}$)) for a given processor is 95° Celsius (C.), a guaranteed operating frequency may also be determined at higher (105° C. as an example) and lower (85° C., 70° C.) temperature set points as well. For every processor, temperature and frequency pairs may be stored in the processor as model specific register (MSR) values or as fuses that a power controller can access. An example of tested configurations and associated frequencies is listed below in Table 1.

As illustrated in Table 1, multiple configurations for a processor are shown. Each configuration may be associated with a configuration identifier, a maximum operating temperature (in terms of degrees Celsius), a guaranteed operating frequency (in terms of Gigahertz (GHz)), a maximum power level, namely a TDP level (in terms of Watts), and a maximum case temperature (in terms of degrees Celsius). As seen in Table 1, by way of these different configurations, when a processor is specified to operate a lower temperature levels, a higher configuration can be selected (and thus higher guaranteed operating frequency). Note that while not illustrated for convenience in Table 1, understand that additional operating parameters including core count, maximum current and so forth also may be specified. Furthermore, while Table 1 shows an example in which a fixed TDP value exists, in other cases, this TDP level also may vary with temperature, such that for a higher configuration (lower temperature), a correspondingly higher TDP value may be present.

TABLE 1

| Configuration Identifier | Tj, C. | Frequency, GHz | TDP, W | Tcase, C. |
|---|---|---|---|---|
| 1 | 105 | 2.6 | 205 | 93 |
| 2 | 95 | 2.7 | 205 | 83 |
| 3 | 80 | 2.8 | 205 | 68 |
| 4 | 65 | 2.9 | 205 | 53 |

Different thermal values can be used as a thermal set point. In some cases, actual processor temperature, as determined by measured junction temperature, can be used. In other cases, a case temperature can be specified, and a processor external temperature can be used. Regardless of how the cooling is provided by the system, as long as the system is designed to meet case temperature value, it will meet the junction temperature requirement and the associated frequency values and/or core counts can be guaranteed. For example, with reference to Table 1, if a cooling solution is designed to meet a case temperature of 83° C., one can guarantee a frequency of 2.7 GHz.

In another example, the processor can be tested at HVM at a single frequency, but different core counts are specified as illustrated in Table 2 below. This increase in core count is possible due to lower leakage power at lower temperatures and translating that available power to offer more cores instead of higher frequency. Of course other combinations are possible, such as where both guaranteed operating frequency and core count may be different for each different configuration (along with possibly other operating parameters).

TABLE 2

| Configuration | Tj, C. | Frequency, GHz | Core Count | TDP, W | Tcase, C. |
|---|---|---|---|---|---|
| 5 | 105 | 2.6 | 24 | 205 | 93 |
| 6 | 65 | 2.6 | 26 | 205 | 53 |

In another example, the processor can be tested at HVM at a single frequency, but different core counts and TDP levels are specified as illustrated in Table 3 below. As illustrated in Table 3, configuration 7 allows the processor to operate at reduced cooling while staying within its junction temperature limit. Note that frequency is kept the same as for configuration 8. However, TDP as well as core count are set lower for configuration 7 to allow operation with reduced cooling. This could be a result of high density system, cheaper heatsinks, reduced fan speed, lower system ambient just to name a few possibilities.

TABLE 3

| Configuration | Tj, C. | Frequency, GHz | Core Count | TDP, W | Tcase, C. |
|---|---|---|---|---|---|
| 7 | 105 | 2.6 | 20 | 185 | 95 |
| 8 | 105 | 2.6 | 24 | 205 | 93 |

According to one technique, a datacenter operator-triggered configuration selection may occur. In this technique, a datacenter operator has prior knowledge of the current platform cooling capability and compute demand. A platform or node management controller can enumerate the available tested configurations by reading processor registers and switch to a configuration to match the desired performance or core count level. This option gives complete control to the system operator and allows the management controller to take advantage of any increased datacenter cooling capacity According to another technique, a processor itself may automatically trigger configuration selection based on thermal measurements. In this technique a power controller or other processor-internal entity may determine a thermal margin and switch to a tested configuration that is appropriate for the current platform cooling capacity. This methodology includes lower level of engagement from the datacenter operator and automates the task of sensing and switching configurations.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to control processor 110 to operate at one of multiple different configurations. Such configurations may be stored, e.g., in a non-volatile storage of processor 110 and may include information regarding at least one of guaranteed operating frequency and core count at which the processor may operate at a given temperature operating point. In this way, PCU 138 may dynamically control processor 110 to operate at one of these configurations based at least in part on temperature information, as described further herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
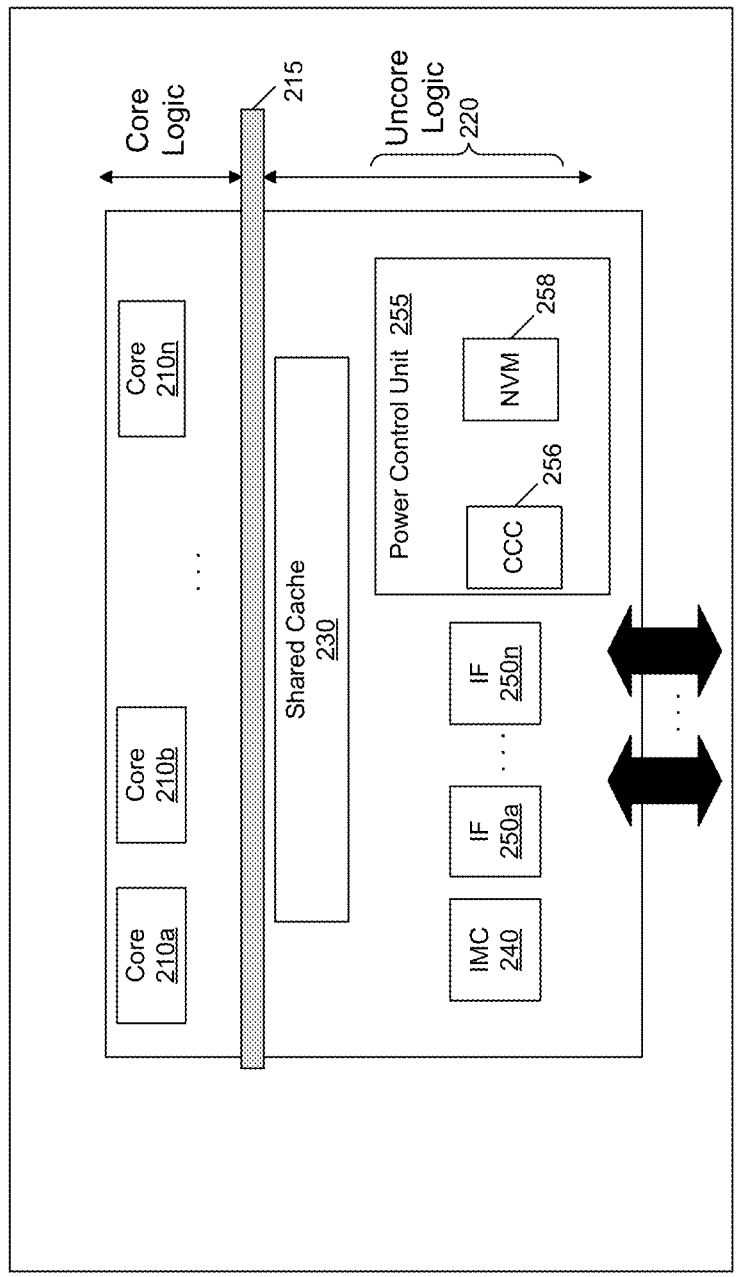
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250, a performance monitoring unit (PMU) 260 and a power control unit 255, which may include logic to perform power management techniques as described herein. In addition, power control unit 255 may include a configuration control circuit 256 which may, based at least in part on thermal information, dynamically determine a given one of multiple configurations at which processor 200 is to operate. To this end, configuration control circuit 256 may access a non-volatile memory 258 in which these multiple configurations are stored. Although shown within PCU 255 for ease of illustration, understand that in other embodiments, such non-volatile storage may be otherwise located.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
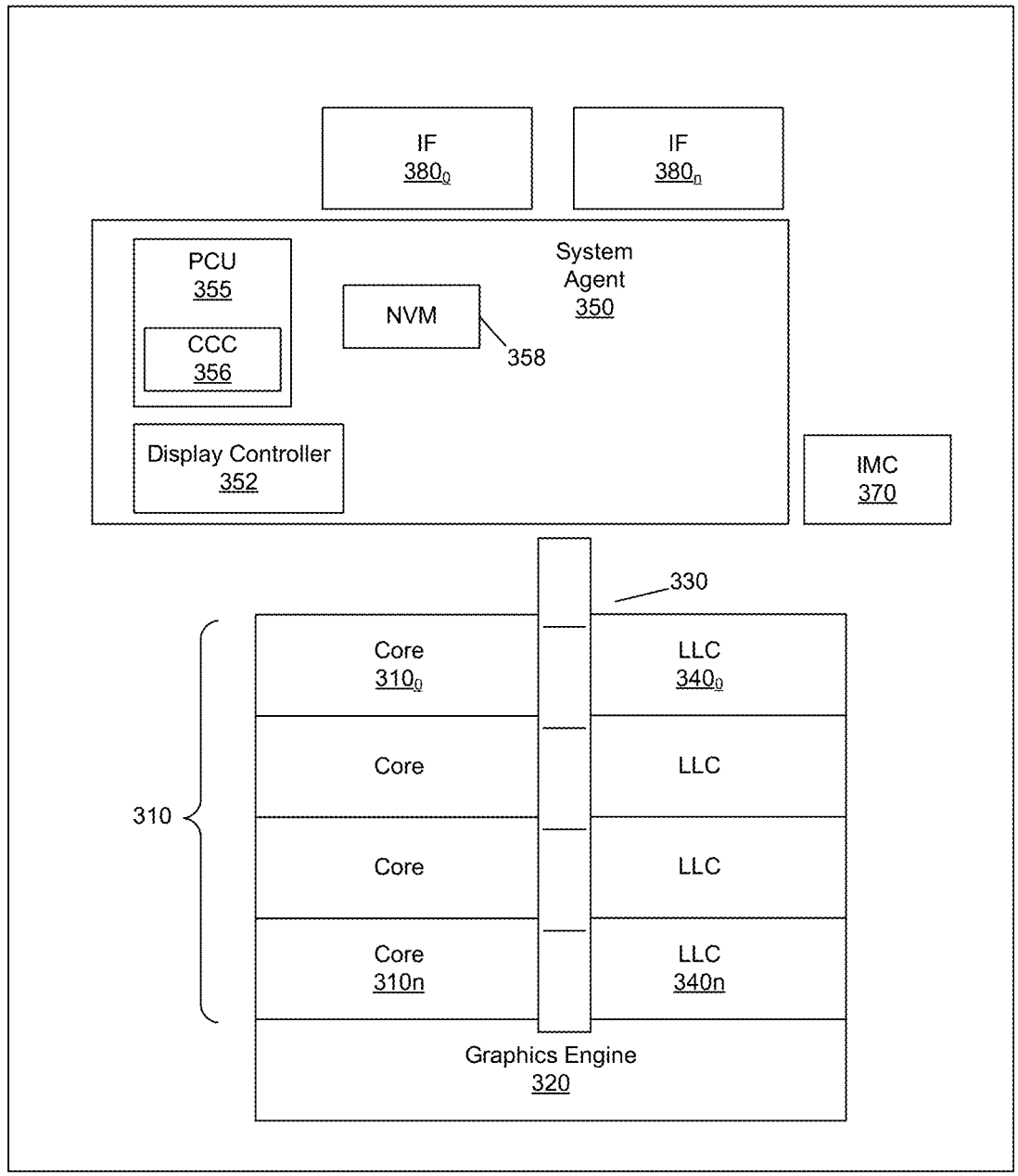
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include a configuration control circuit 356 select one of multiple configurations stored in a non-volatile memory 358 for use in controlling operation of processor 300 based on identification of a given thermal set point as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
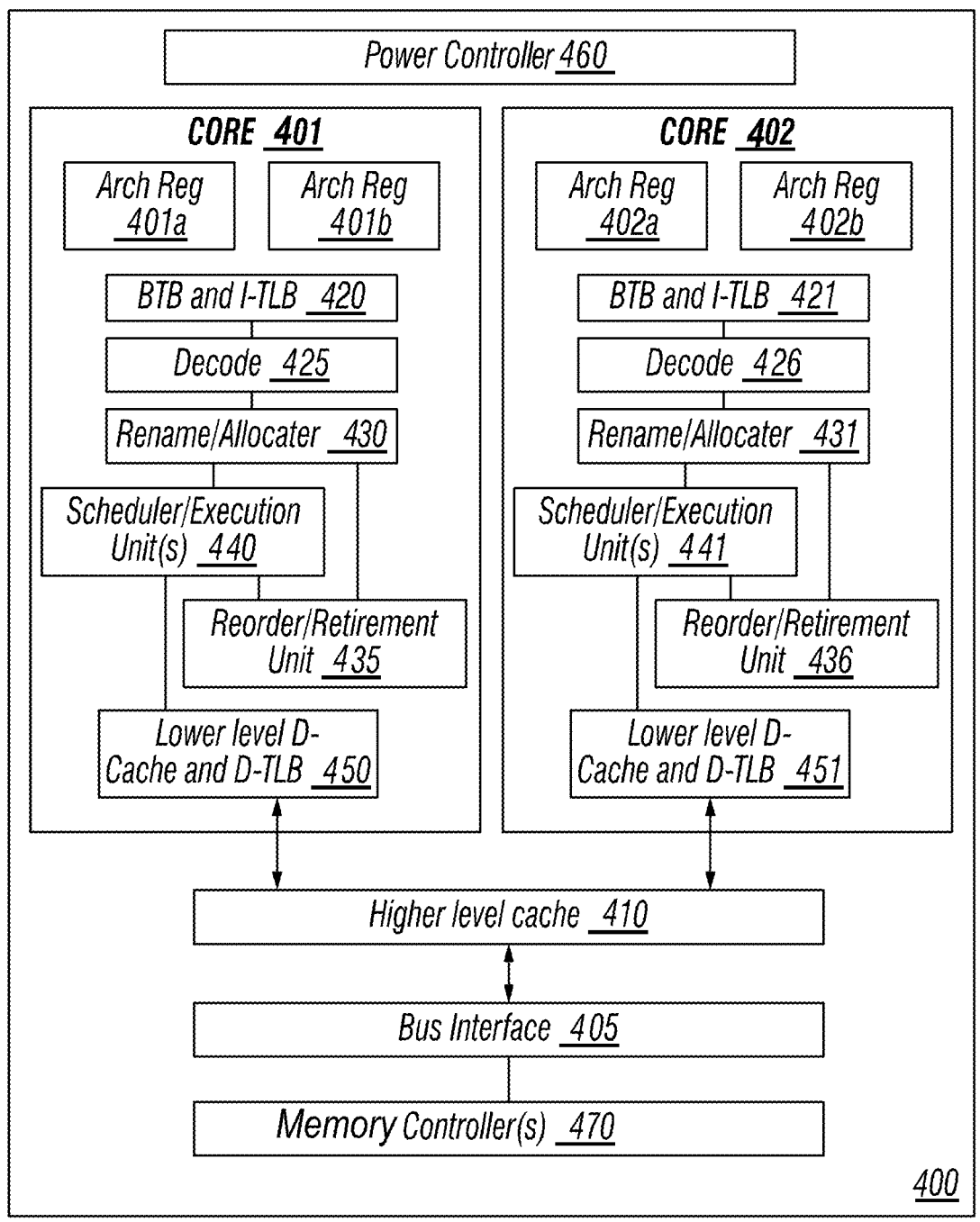
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
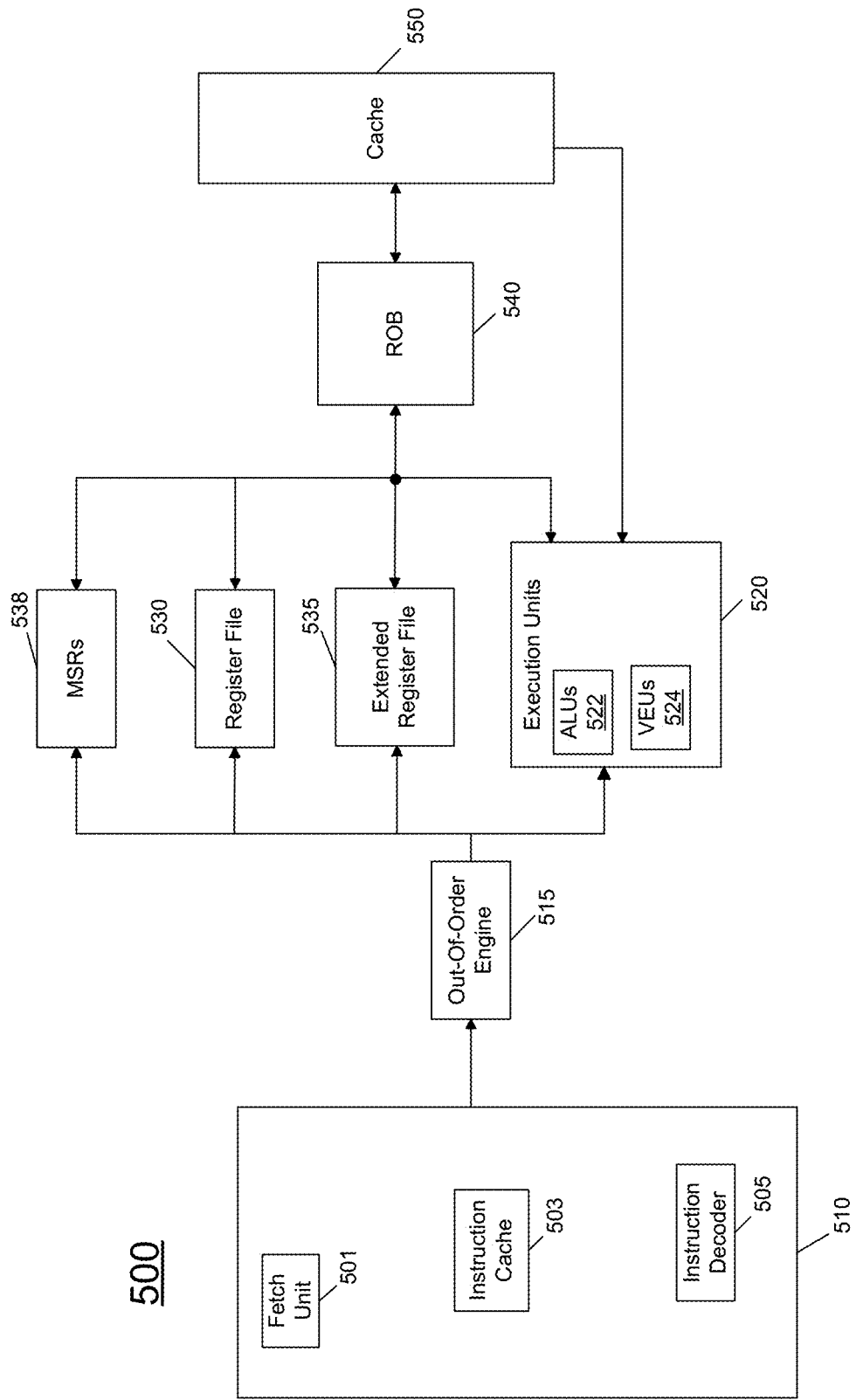
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. As such, a power controller (not shown in FIG. 5) may dynamically determine an appropriate configuration for all or a portion of processor 500 based at least in part on thermal set point, determined as described herein. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
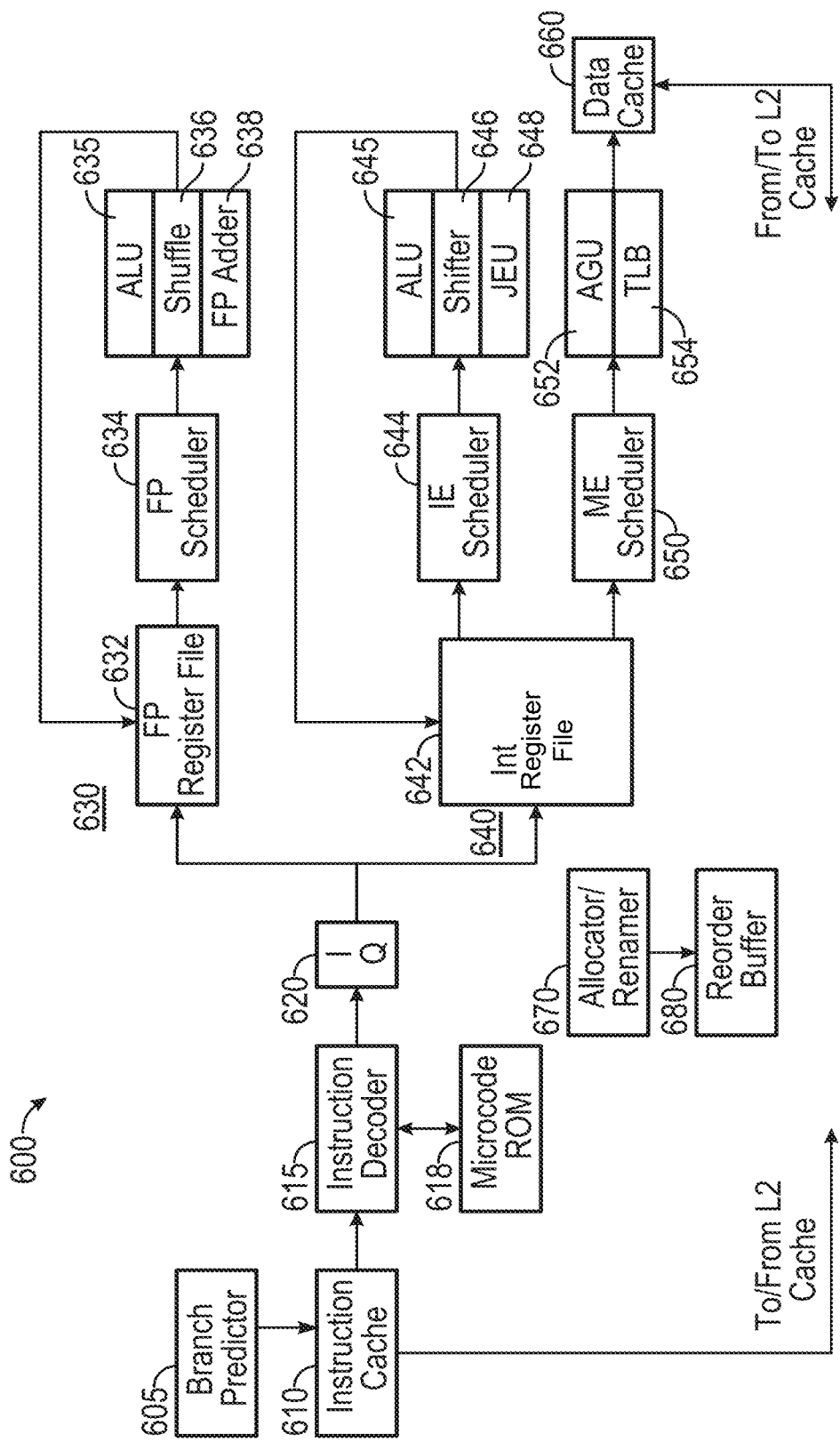
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Note that performance and energy efficiency capabilities of core 600 may vary based on workload and/or processor constraints. As such, a power controller (not shown in FIG. 6) may dynamically determine an appropriate configuration for all or a portion of processor 500 based at least in part on thermal set point, determined as described herein. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
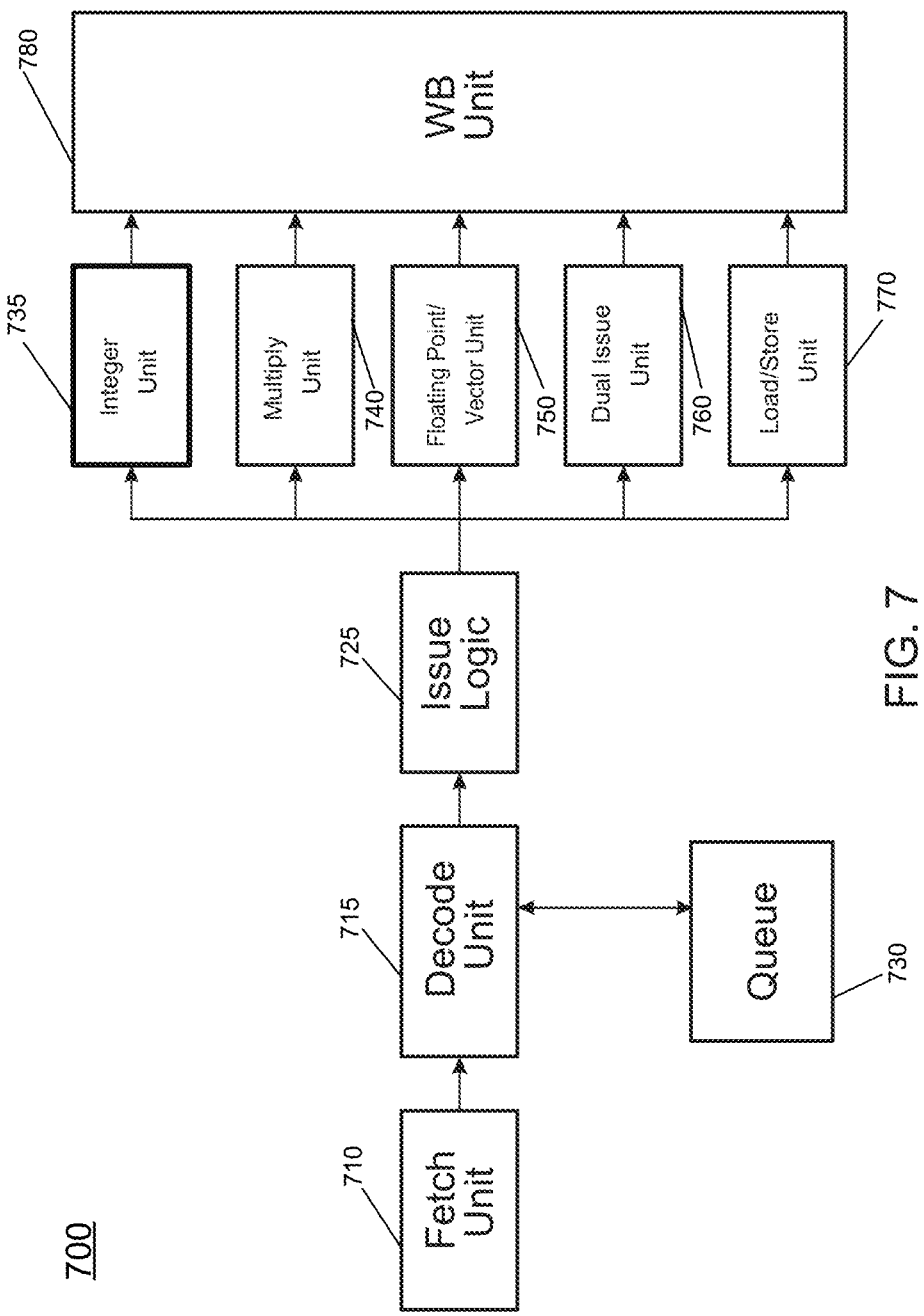
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instruction and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
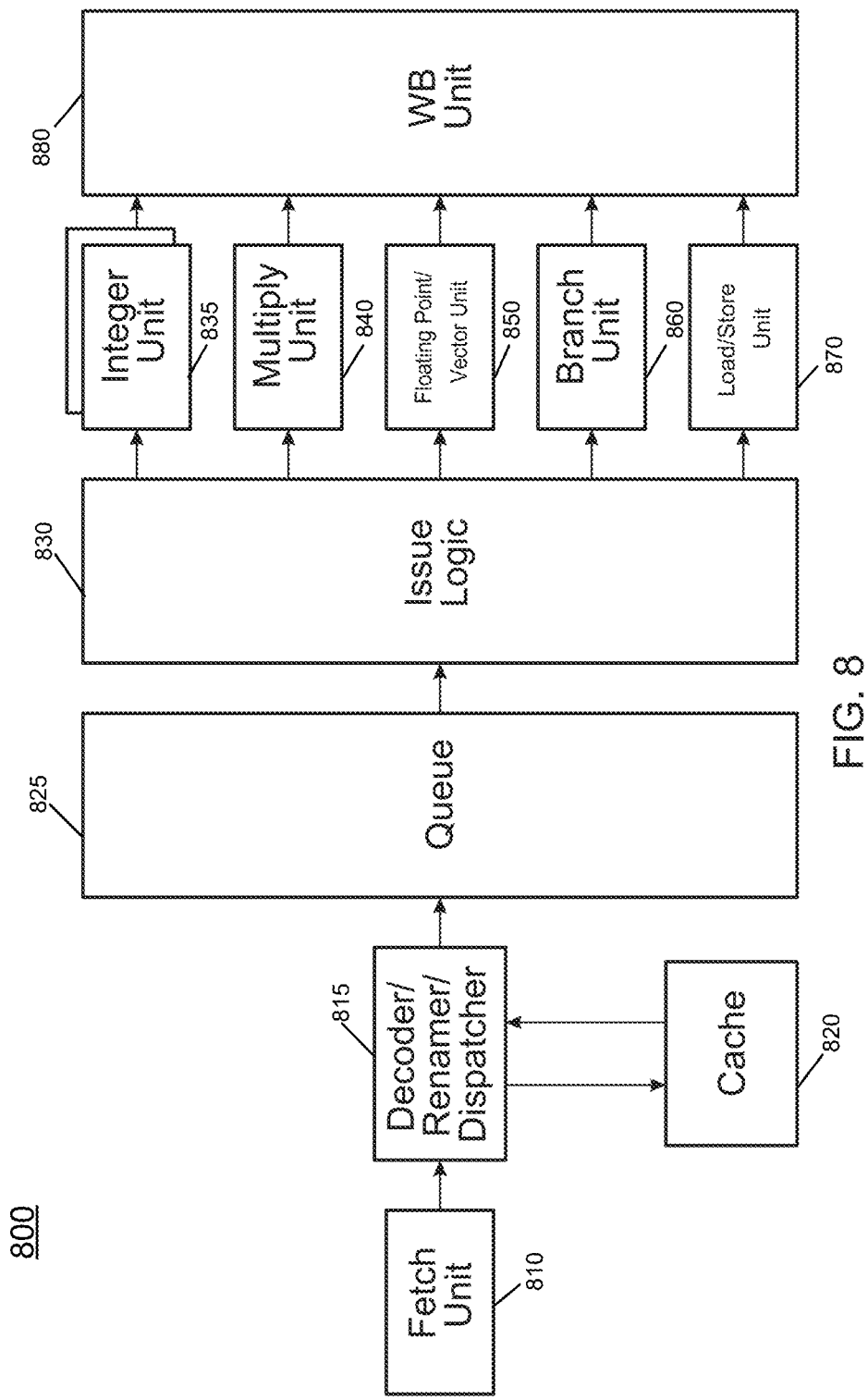
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a write-back unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
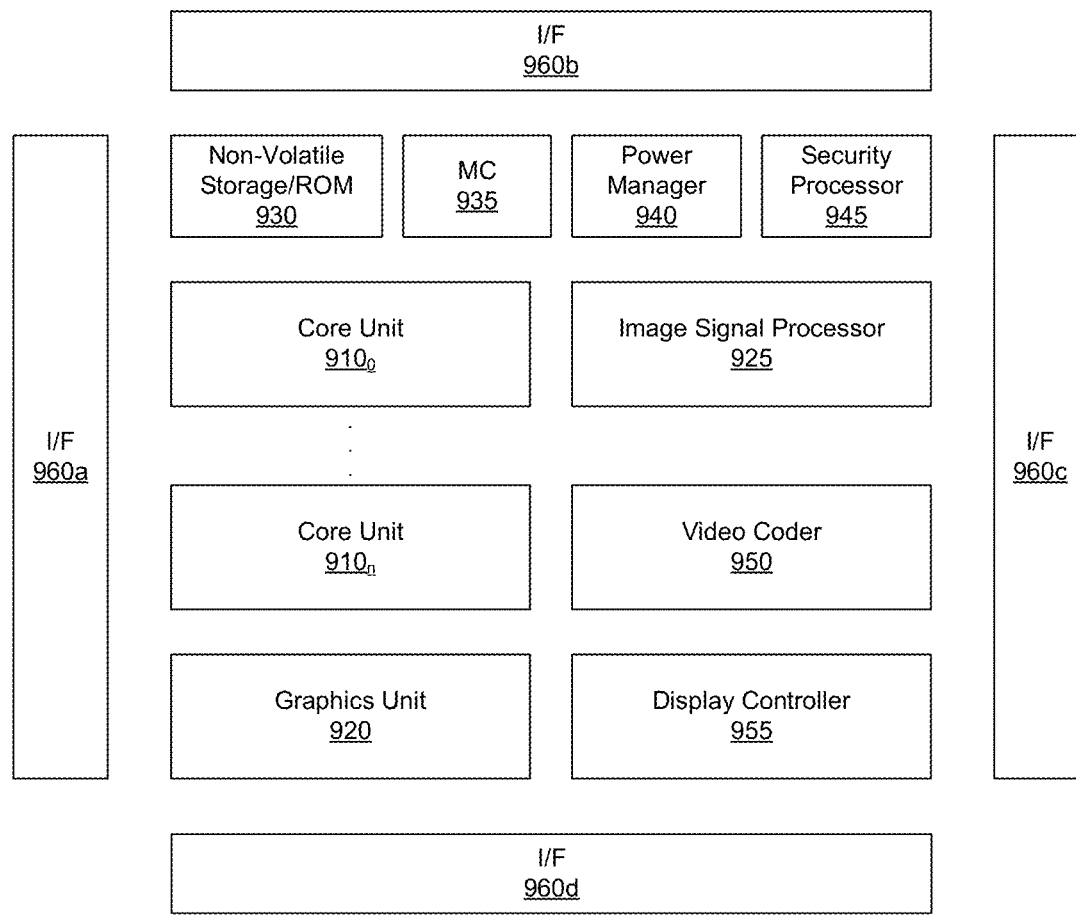
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software and other information. In embodiments, non-volatile storage 930 may store multiple configurations as described herein, which may be prioritized for use by firmware.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including dynamic determination of an appropriate configuration based on thermal point selection.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
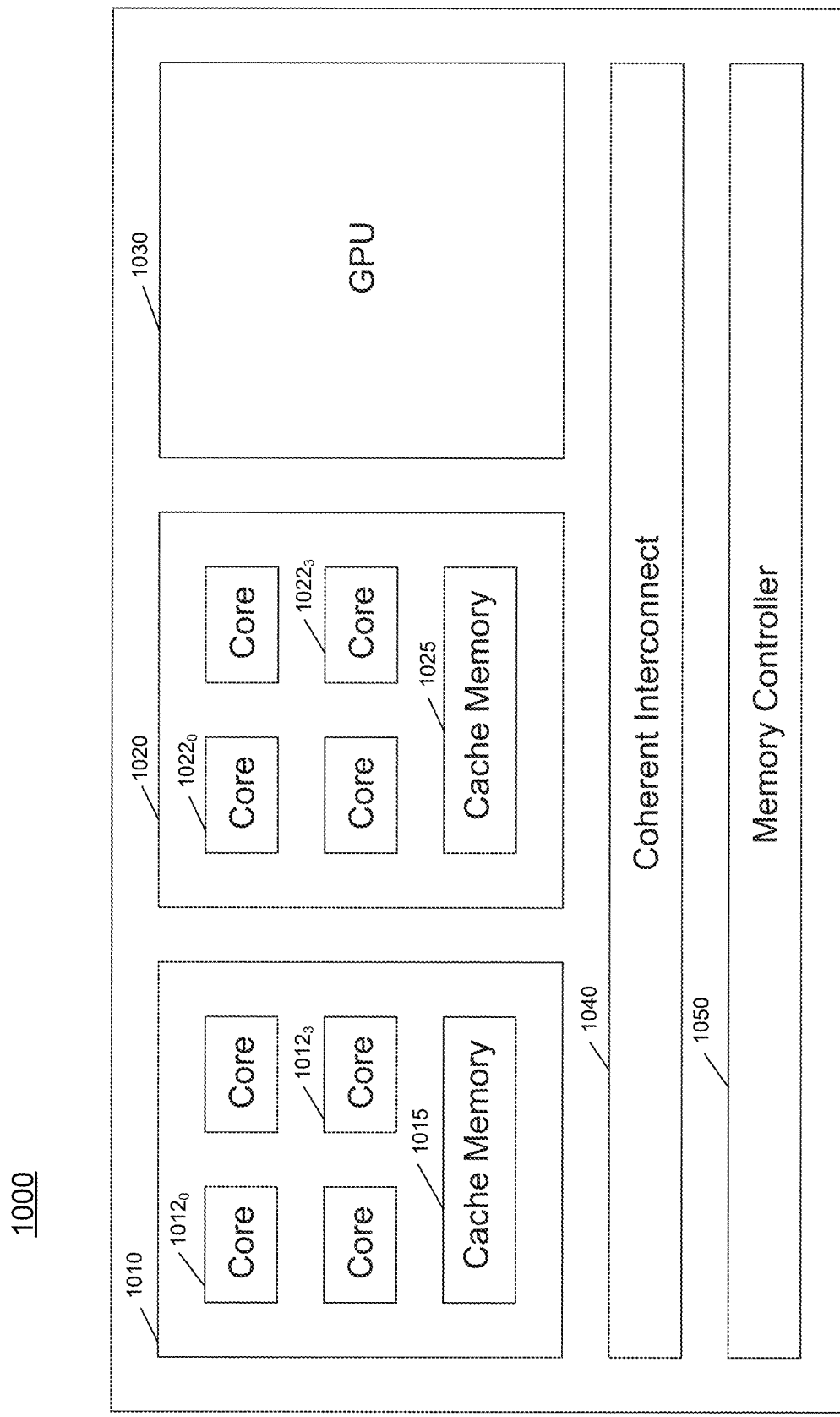
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
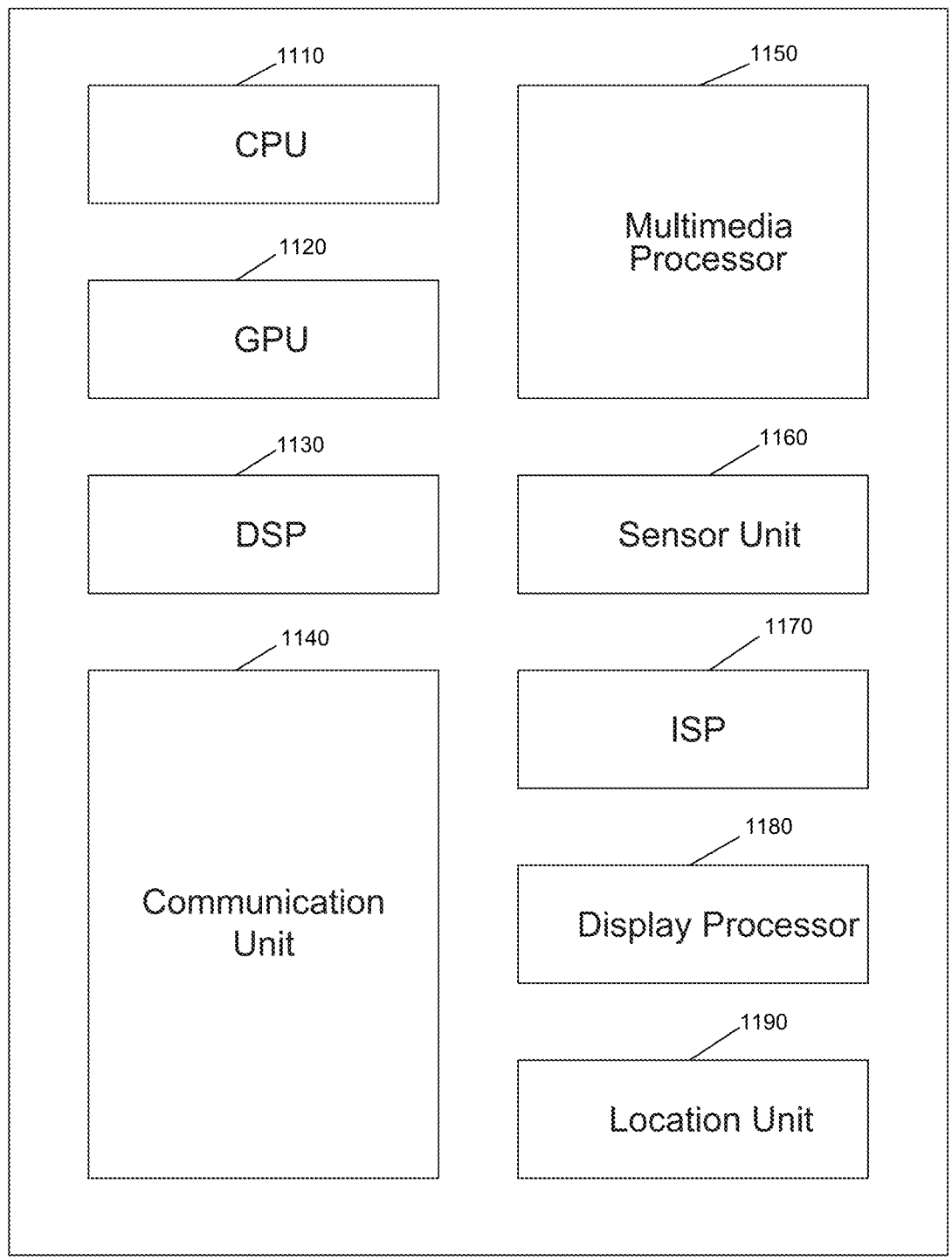
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
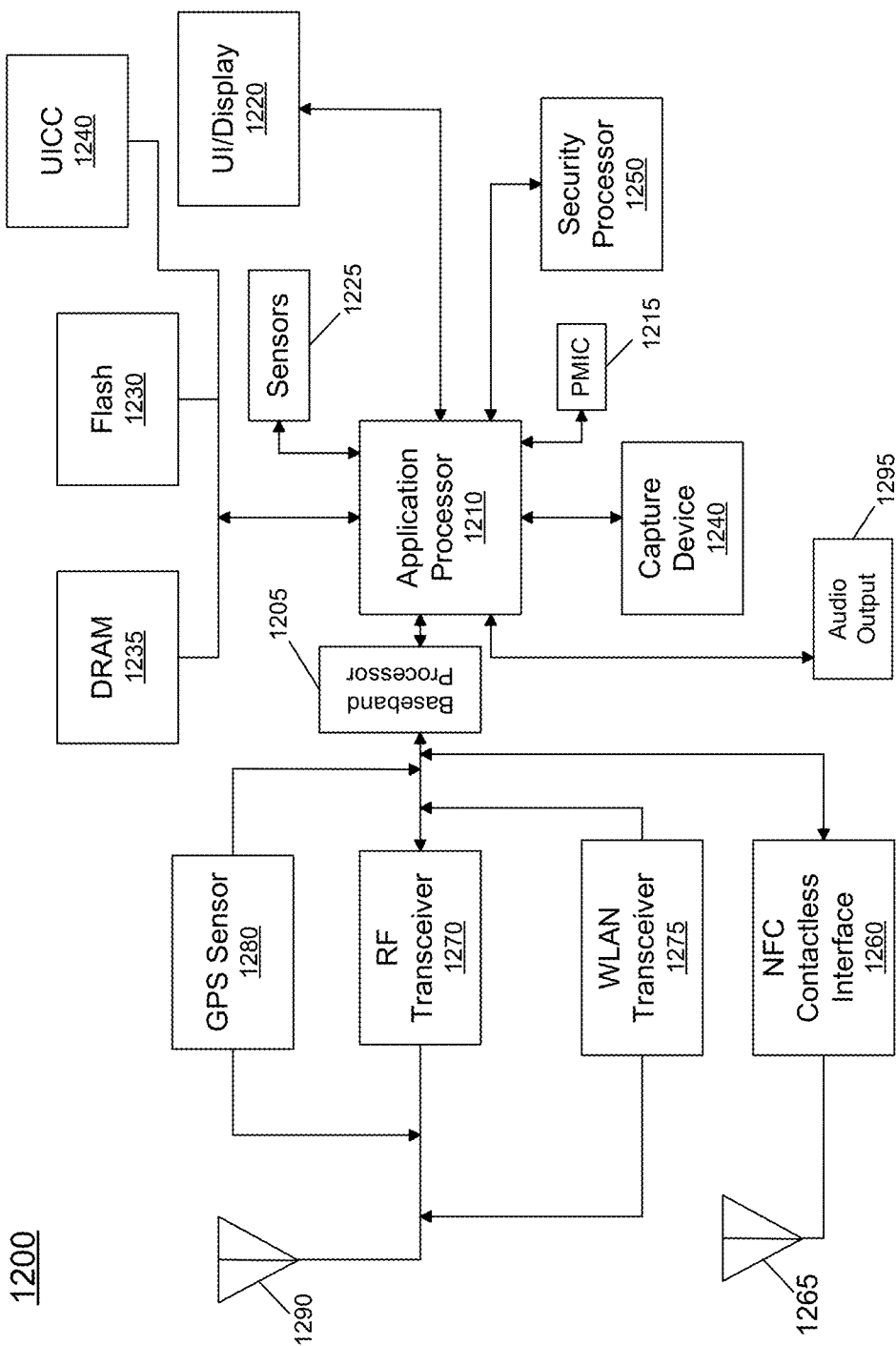
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
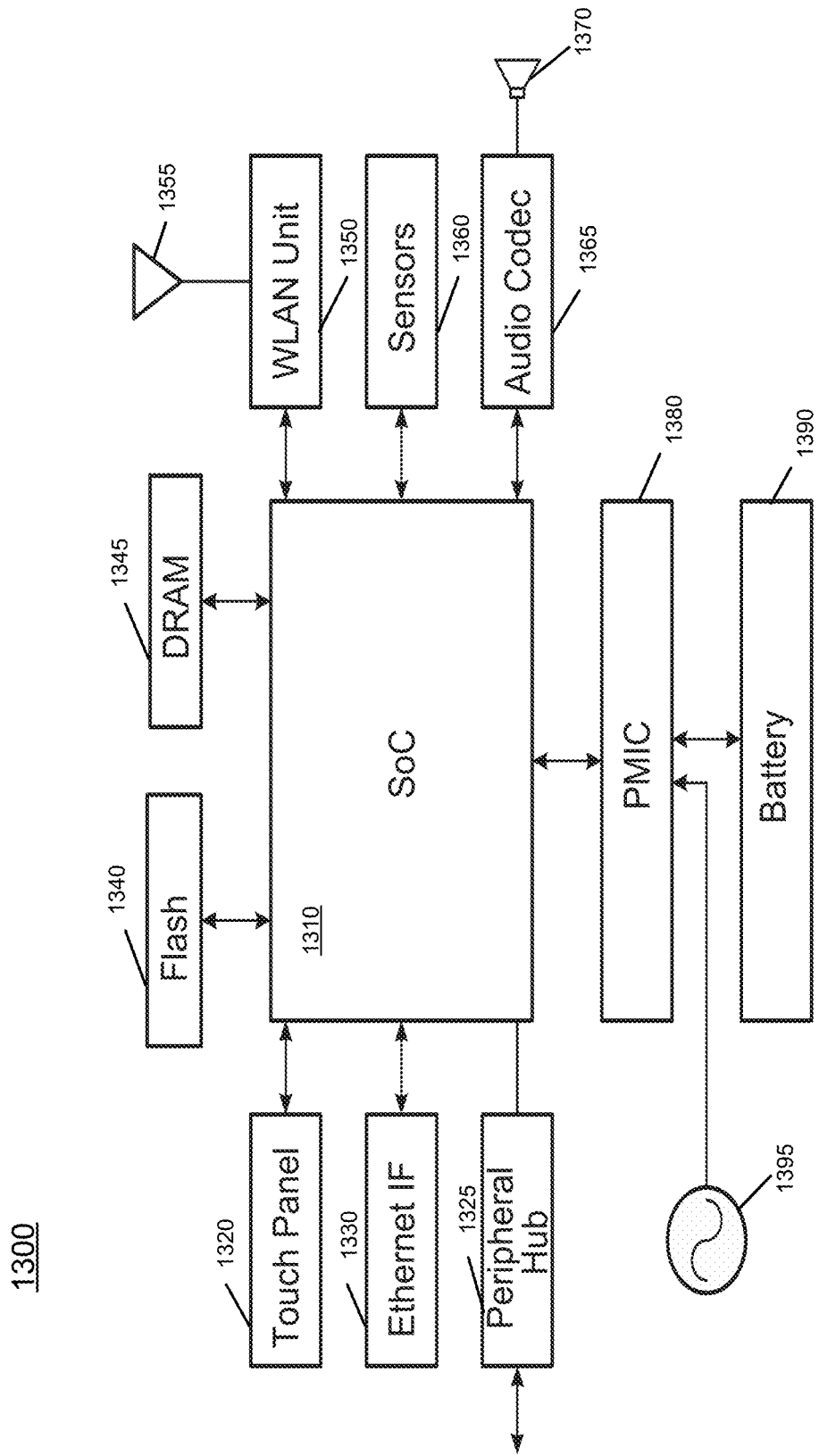
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
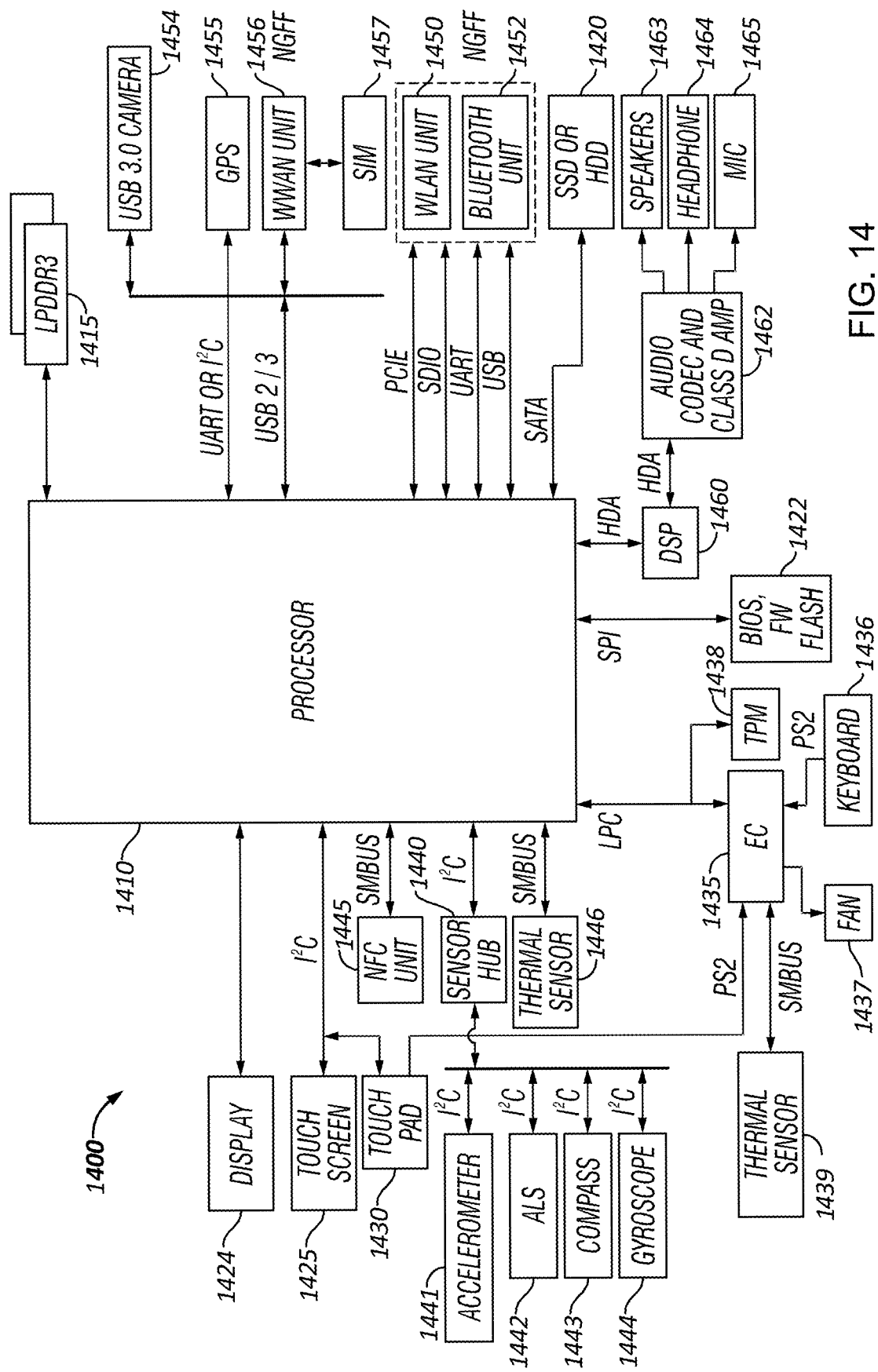
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
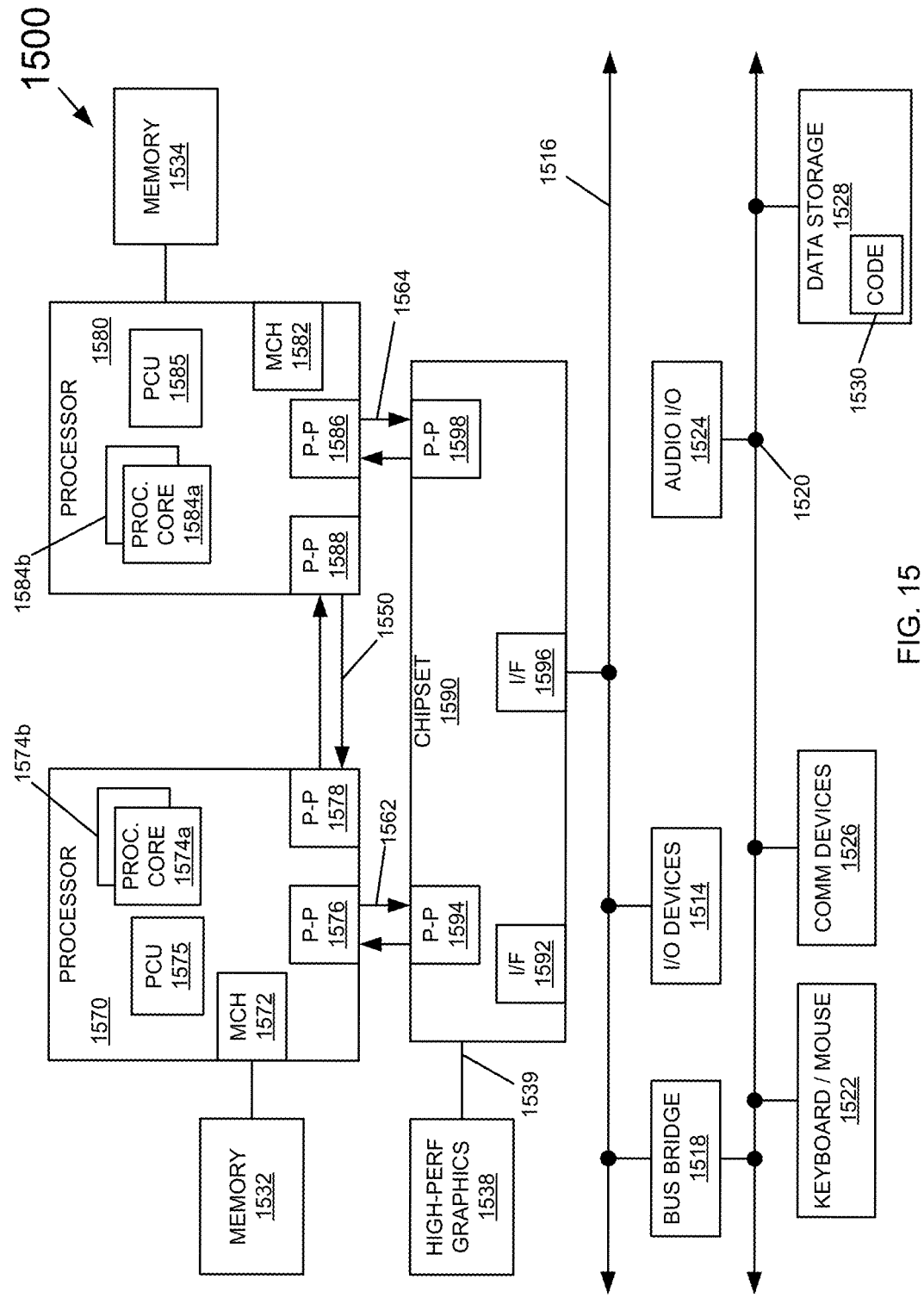
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU 1575, 1585 or other power management logic to perform processor-based power management as described herein. To this end, PCUs 1575 and 1585 may include configuration control circuitry to dynamically determine, based at least in part on identification of a thermal set point, an appropriate configuration of multiple configurations, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
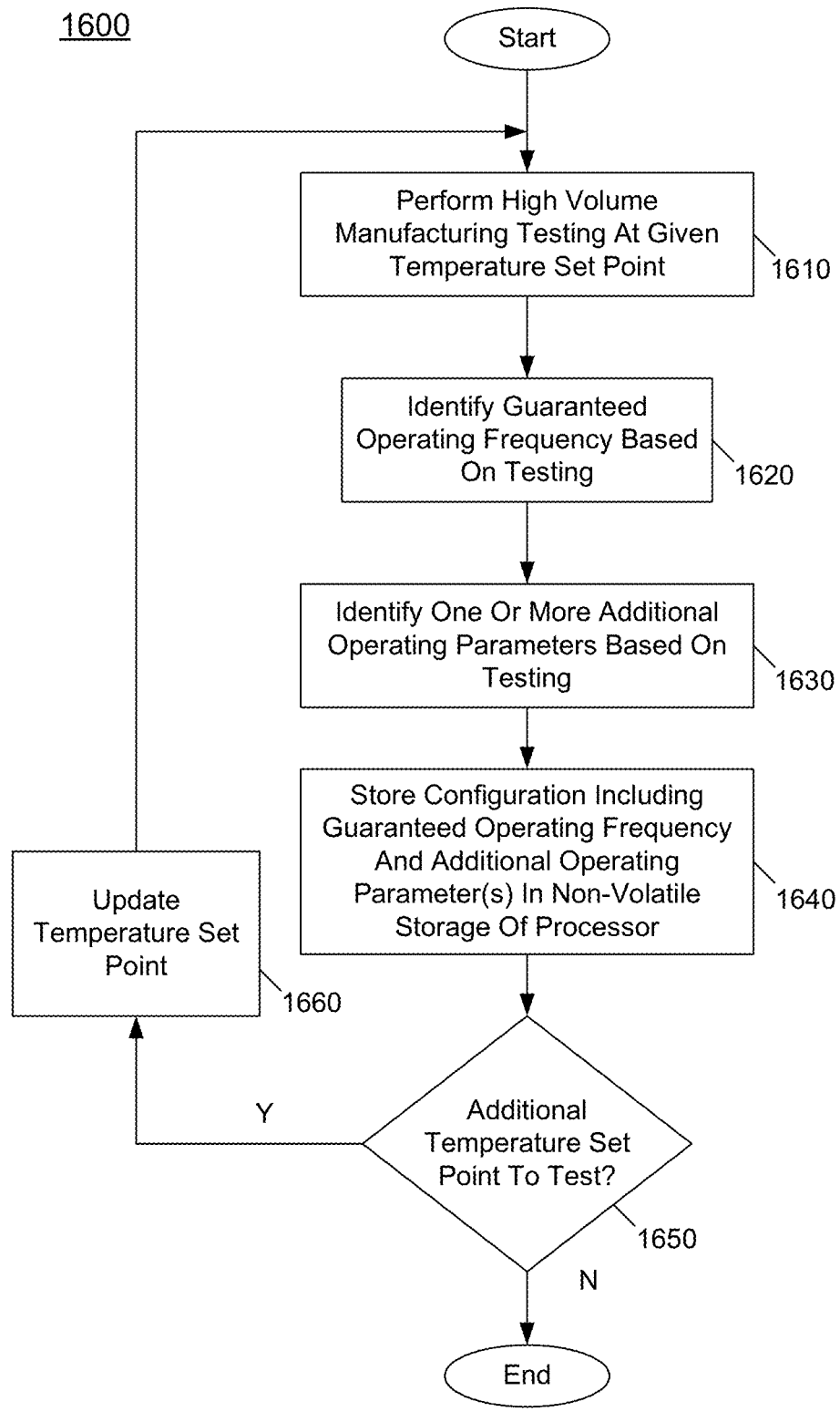
FIG. 16 is a flow diagram of a method in accordance with an embodiment of the present invention.

Referring now to FIG. 16, shown is a flow diagram of a method in accordance with an embodiment of the present invention. As shown in FIG. 16, method 1600 is a method for performing HVM testing to enable multiple configurations of a processor to be determined and stored as described herein. In embodiments, method 1600 may be performed by test circuitry implemented within HVM test equipment of a processor manufacturer. As such, embodiments may be performed by hardware circuitry, firmware, software and/or combinations thereof. In a particular embodiment, an HVM tester, which may include components to inject test routines and cause environmental conditions to be provided to the processor, may further include computing circuitry, such as one or more servers, computing devices, circuit boards or so forth to perform the testing.

As illustrated, method 1600 begins by performing HVM testing at a given thermal or temperature set point (block 1610). This temperature set point may be associated with a given configuration of multiple configurations for the processor. More specifically as described herein, multiple maximum junction temperatures (also referred to herein as thermal set points or temperature set points) may be provided to enable selection of an appropriate one of those multiple configurations at which the processor is to run. That is, a processor in accordance with an embodiment may have multiple possible configurations at which it can operate. The determination of which configuration is selected may be based on a given thermal operating range at which the processor is or is expected to operate (such that the processor temperature is maintained below the thermal set point). A given configuration is associated with various operating parameters including operating frequency, maximum temperature, power budget, core count and maximum current consumption (among others), and may be set based on a selected temperature set point (or configuration).

To effect HVM testing at a given temperature set point, at block 1610 the test equipment may cause a given amount of heat to be provided to the processor to cause it to operate at the given temperature set point. For purposes of example, assume that this first temperature set point is at approximately 105° Celsius (C.).

Next the processor may be controlled to execute a variety of different workloads to test and stress functionality of the processor. Some of these workloads may cause execution at a power virus level. At block 1620 during execution of these workloads a guaranteed operating frequency may be identified (for this given temperature set point) based on the testing. More specifically, this guaranteed operating frequency, e.g., a P1n frequency, is determined such that for a compute intensive workload, sufficient thermal, power and current headrooms exist. As such, a processor can operate at this guaranteed operating frequency for a compute intensive workload, without degradation due to headroom violations.

In embodiments, control next passes to block 1630, where one or more additional operating parameters can be identified based upon the testing. That is, in addition to identifying an appropriate guaranteed operating frequency for this given temperature set point, an appropriate maximum current (ICCmax) and/or TDP value also may be determined. And in some embodiments, additional operating parameters such as core count at the guaranteed operating frequency and design life in years (e.g., 3 yr vs. 5 yr) also may be identified.

With reference still to FIG. 16, control next passes to block 1640 where the configuration including the guaranteed operating frequency and any additional operating parameters associated with the given temperature set point (which is another parameter of the configuration) may be stored in the processor. More specifically at block 1640 this information may be stored in a non-volatile storage of the processor.

In a particular embodiment, the test equipment may burn fuses within the processor to provide this information. In other cases, the information may be written to another non-volatile memory of the processor. For example, the non-volatile storage (either by fuse or other persistent storage) may include multiple entries, each to store a given configuration. In an embodiment, a configuration may include at least thermal set point and guaranteed operating frequency, and may further include core count, TDP and ICCmax maximum values, all associated with a given configuration identifier. It is further possible that the configuration information instead may be provided to the processor during operation by way of a boot process, in implementations in which this configuration information may be stored as part of firmware such as BIOS.

Still with reference to FIG. 16, it can be determined next at diamond 1650 whether there are additional temperature set points to test. That is as described herein, configuration values for multiple temperature set points can be established. If there are additional temperature set points, control passes to block 1660 where the temperature set point may be updated. For example, the test equipment may cause the processor to be cooled to a lower maximum junction temperature level, e.g., 95° C. Then the operations described above may proceed to develop another set of operating parameters for another configuration of the processor, which also may be stored in the same non-volatile storage (e.g., other fuses, another entry of a non-volatile table or so forth). Understand while shown at this high level in the embodiment of FIG. 16, many variations and alternatives are possible. For example, in some cases one or more of the configurations may be cryptographically stored or otherwise locked so that an end user cannot access such configuration(s) without further consideration. That is, one or more additional configurations can be locked during manufacture. Then when a customer (e.g., OEM or end user) pays a premium (either a higher base price or a later in-field purchase), the locked configuration(s) may be unlocked. For example, a cryptographic key can be sent that may be used to unlock one or more locked configurations. Of course other manners of locking/unlocking can occur in other embodiments.

Figure 17:
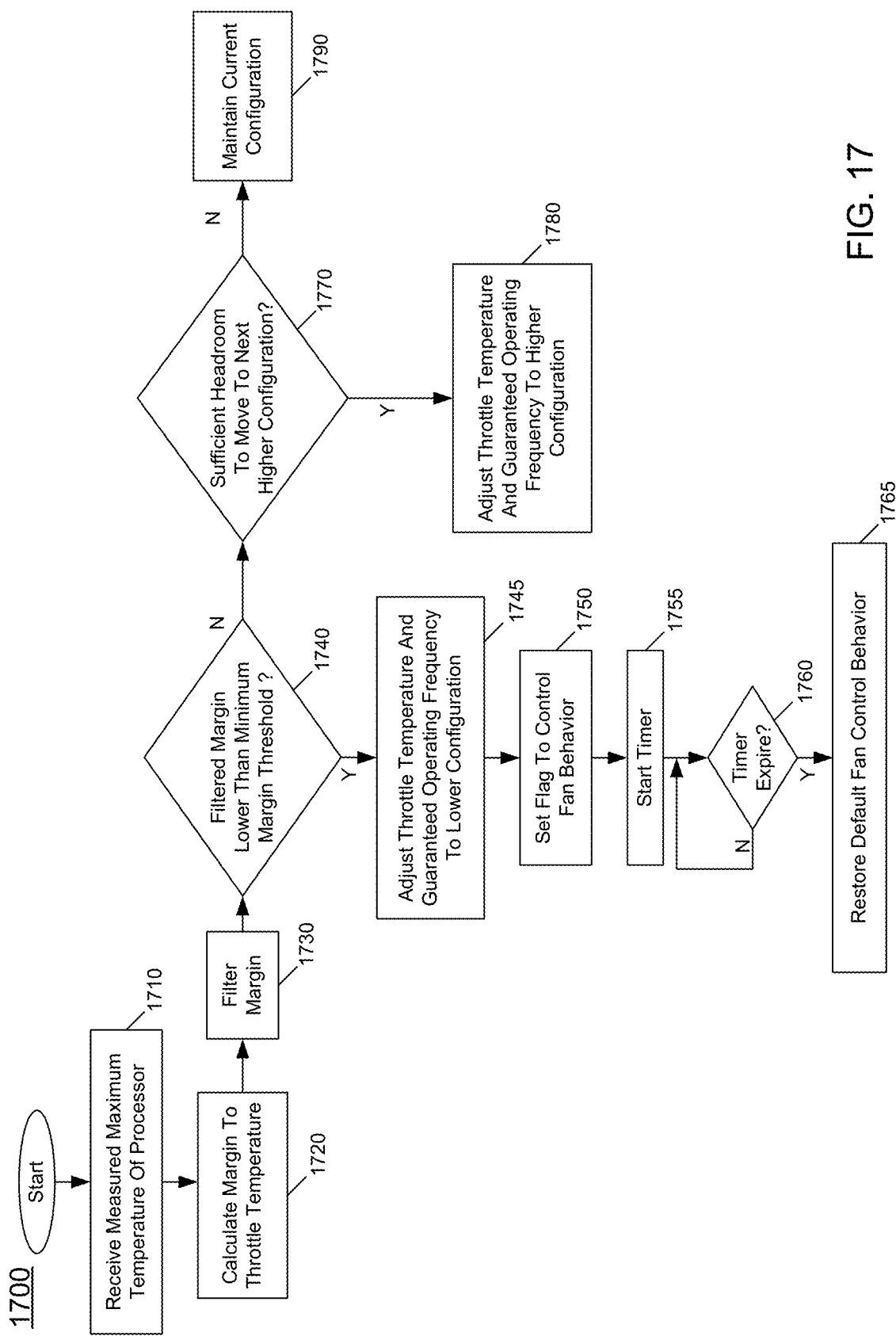
FIG. 17 is a flow diagram of a method in accordance with another embodiment of the present invention.

Referring now to FIG. 17, shown is a flow diagram of a method in accordance with another embodiment of the present invention. More specifically, method 1700 is a method for automatically updating, during normal operation, a configuration selection for a processor in accordance with an embodiment. In embodiments, method 1700 may be performed by a power controller of a processor such that method 1700 may be performed by hardware circuitry, firmware, software and/or combinations thereof.

At a high level, method 1700 operates, based upon detection of a given temperature at which the processor is operating, to determine whether another one of multiple available configurations is more appropriate for the processor based upon the temperature at which it is operating. As described herein, this processor configuration may include, but is not limited to, at least one of guaranteed operating frequency and core count, and may further include other configurable operating parameters including TDP and ICCmax. In a particular embodiment, based at least in part on temperature, BIOS can set priority order of multiple configurations stored in the processor. Each configuration may be defined by a combination of core count, TDP, throttle set point, design life and corresponding guaranteed P1n frequency As illustrated, method 1700 begins by receiving a maximum temperature of a processor (block 1710). For example, the power controller may receive thermal information periodically from a number of thermal sensors within the processor. From these different thermal readings, the maximum temperature can be identified. Based at least in part on this maximum temperature, a margin to a throttle temperature can be calculated (block 1720). This throttle temperature is a level at which the processor begins to throttle operation (e.g., by reduction of (at least) frequency). For example, the power controller may make reference to a $T_{jmax}$ for a current configuration of the processor and determine a margin or difference between the maximum measured temperature and this $T_{jmax}$ value. In some embodiments, the throttle temperature may be set at this $T_{jmax}$ value. In other cases, an additional further amount of headroom may be provided, such that the processor does not begin to throttle until a temperature is reached that slightly exceeds $T_{jmax}$. For example, in a case in which $T_{jmax}$ is set at 105° C., the throttle temperature may be set at a value of 108° C., providing a few more degrees of headroom before throttling activity begins. In any event, control passes from block 1720 to block 1730 where this calculated margin may be filtered. For example, the power controller may include a filter such as a low pass filter to smooth out variations due to extreme instantaneous temperature measurements.

Still with reference to FIG. 17, control next passes to diamond 1740 to determine whether this filtered margin falls below a threshold level, namely a minimum margin threshold. In an embodiment, this threshold may be set at a level of zero, such that if the filtered margin is negative (i.e., the measured temperature exceeds the throttle temperature), control passes to block 1745.

At block 1745, the processor may be re-configured to a lower configuration. More specifically, the power controller may re-configure the processor to adjust the throttle temperature and (at least) the guaranteed operating frequency to lower levels. For example, in an embodiment in which there are multiple configurations, a next lower configuration may be selected and appropriate values for throttle temperature, P1 frequency and/or core count (among others) may be identified. Further understand that in response to this re-configuration the power controller may cause operation to proceed at this new guaranteed operating frequency level. The power controller also may set a flag to override regular cooling system operation. For example, this set flag may prevent fans or other cooling system components from slowing down. In an embodiment, this flag may trigger a message to a management controller, in implementations within a server or other computing device that has internal or external cooling subsystems controlled by such management controller. Further at this point, a timer may be started (block 1755). When it is determined that this timer has expired (as determined at diamond 1760), control passes to block 1765 where normal fan control or other cooling system behavior may be restored, and this flag may be reset.

Understand that the combination of increased cooling and increased guaranteed operating frequency may enable the processor to cool to lower levels. And certainly, with the adjustment of the throttle temperature to a lower configuration (namely higher temperature), processor operation is not actually throttled as the processor may operate at the full operating parameters of this lower configuration state, enabling increased performance even at a (slightly lower) guaranteed operating frequency (as compared to the impact of a throttle event due to a temperature violation of a previous throttle temperature).

The effect of increased fan speed will eventually be felt by the die temperature with some time lag. During these transitions to higher $T_{jmax}$/lower frequency configuration, the processor may set a flag for a predefined time period. During this time, the system may be controlled to not reduce cooling to the processor, which allows the effect of fan speed increase to be realized at the die level. If the transition to a higher configuration happens during this transient phase, by maintaining the cooling system in override operation enough thermal margin may build up, to enable the processor configuration to move to the higher frequency state if allowed by the thermal margins. After a predefined time interval, the flag is reset. It is likely that the processor may have higher thermal margin due to an increased $T_{jmax}$ limit. Once the flag is reset, this thermal margin can be utilized by fans to reduce speed to save fan power. In an embodiment, when a processor configuration state changes to a higher $T_{jmax}$, the flag is turned on and the timer for keeping the flag is reset.

Still with reference to FIG. 17, if instead it is determined that the filtered margin exceeds the threshold level, control passes to diamond 1770 to determine whether there is sufficient headroom to move to a next higher configuration for the processor. More specifically, this determination may be based on an analysis between the filtered margin and a difference in throttle temperature between the current configuration and the next higher configuration. For example, assume that the current configuration value for throttle temperature is at 105° C. and that a next higher configuration has a throttle temperature of 95° C. If the filtered margin is greater than 10° C., there is sufficient headroom. And thus in this instance, control passes from diamond 1770 to block 1780. At block 1780, the throttle temperature and guaranteed operating frequency (and/or core count) may be adjusted to the next higher configuration. As such, a re-configuration process may proceed to a higher configuration. More specifically, the power controller may re-configure the processor to adjust the throttle temperature and (at least) the guaranteed operating frequency to higher levels. Finally with reference still to FIG. 17, if it is determined that there is not sufficient headroom, control passes to block 1790 where the current configuration may be maintained.

In the embodiment of FIG. 17, it may be assumed that a system boots to the highest temperature configuration, and lower temperature configurations may dynamically occur based on continuous monitoring of a margin to a throttle temperature. With reference back to Table 1, if the margin to the throttle temperature is greater than 10° C., the processor can safely move to the higher frequency of configuration #2. Thereafter if the margin to the throttle temperature is more than 15° C., there is opportunity to further increase frequency, and Tj is reduced and frequency is raised accordingly (to configuration #3). There may come a point that the throttle temperature is reduced low enough that there is insufficient margin to move to the next configuration and no further improvement in frequency is possible. At this stage, there is a possibility that a stringent workload could push against a current throttle limit. If that happens, there are two options available. As one option, voltage/frequency is reduced to stay within the current temperature constraint. As another option, the throttle temperature is adjusted to the next level (higher $T_{jmax}$) and associated frequency is also reduced.

Understand that method 1700 may be performed at a periodic interval. As an example, method 1700 may be performed during each iteration of power controller operation, e.g., which may be on the order of approximately every millisecond. Of course many other time intervals may be used. Note further that many variations and alternatives are possible. For example, while re-configurations from one throttle temperature to a different throttle temperature enables update to one or more of guaranteed operating frequency, core count, TDP and ICCmax, other operational parameters also may be adjusted during such re-configuration. For example, it is entirely possible that different configurations may have the same/different throttle set point with unique combinations of TDP, core count, Icc_max and design life. In one embodiment, these configurations may be prioritized by BIOS or other firmware. BIOS may also have a setting to instruct the processor to not use a particular configuration.

Figure 18:
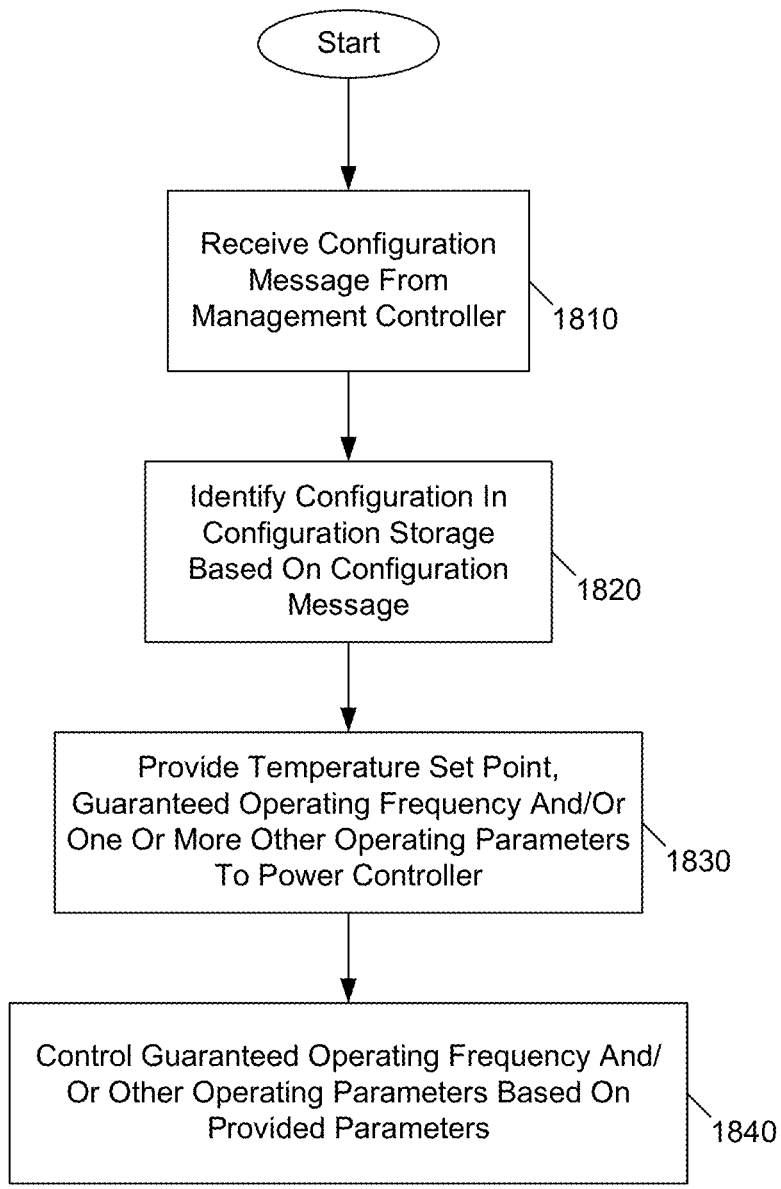
FIG. 18 is a flow diagram of a method in accordance with another embodiment of the present invention.

Referring now to FIG. 18, shown is a flow diagram of a method in accordance with another embodiment of the present invention. As illustrated in FIG. 18, method 1800 is a method for controlling processor configuration based on information received from a processor-external source. More specifically as illustrated in FIG. 18, method 1800 is a method for controlling processor configuration based on information received from a management controller. Such management controller may be a baseboard management controller in the context of a server computer or other datacenter manager entity, such as a node management controller for one or more racks of servers. Method 1800 may be performed by a power controller of a processor, which may be implemented as hardware circuitry, firmware, software and/or combinations thereof.

Assume in the datacenter context, a datacenter manager is aware of the particular configuration of servers or other computing devices that include processors capable of implementing multiple configurations. For example, assume that based upon the rack configuration, servers are implemented with a height of 2 U and having a particular cooling implementation. Further assume that the datacenter manager maintains a relatively low ambient temperature, by means of additional facility cooling. As such, the datacenter manager can guarantee that maximum processor temperature (namely $T_{jmax}$) may be limited to a relatively low value (e.g., 80° C.). In such instances, the processor may be controlled to operate at a relatively high configuration level, meaning that it may operate with a corresponding relatively high guaranteed operating frequency, core counts and so forth.

As illustrated, method 1800 begins by receiving a configuration message from a management controller (block 1810). For example, in a datacenter context, this configuration message may be received from a baseboard management controller or other datacenter entity. The configuration message may include information for selecting a particular configuration. As examples, the configuration message may indicate a configuration identifier corresponding to a given configuration. Or in another case, the configuration message may include a thermal set point or other information. In any event, control next passes to block 1820 where a processor configuration can be identified within a configuration storage based on the configuration message. For example, assume that the configuration message includes a configuration identifier. This configuration identifier may be used to identify the configuration, e.g., in a non-volatile storage that acts as the configuration storage. As such at block 1820 the power controller can read various configuration values, namely thermal set point, guaranteed operating frequency and/or core count, as well as other operating parameters such as a TDP value and ICCmax value. At this point, the power controller may store these configuration values in appropriate configuration storage of the processor, e.g., configuration registers. Thus at block 1830, these values may be provided to the power controller, e.g., for storage in the configuration registers. Thereafter, control passes to block 1840 where guaranteed operating frequency and/or other operating parameters may be controlled based on these provided parameters. That is, the power controller may cause various cores to be activated in a number up to the indicated core count (e.g., based on workload requirements). These cores may be controlled to operate at the guaranteed operating frequency. Furthermore, the power controller may monitor operation of the processor to ensure that the long term power consumption average remains below the TDP level, and that current consumption is maintained below the ICCmax level. Understand while shown at this high level in the embodiment of FIG. 18, many variations and alternatives are possible.

The following examples pertain to further embodiments.

In one example, a processor includes: at least one core to execute instructions; a non-volatile storage to store a plurality of configurations for the processor, the non-volatile storage including a plurality of entries, each of the plurality of entries to store configuration information for the processor for one of the plurality of configurations, the configuration information including at least one of a guaranteed operating frequency and a core count, at least one of the plurality of entries to store the core count, where at least some of the plurality of entries are to store different guaranteed operating frequencies; and a power controller to control the processor to operate at one of the plurality of configurations based at least in part on a selected thermal set point of a plurality of thermal set points of the processor, each of the plurality of thermal set points associated with one of the plurality of configurations.

In an example, the power controller is to receive the selected thermal set point from a management controller coupled to the processor, where the management controller is to provide the selected thermal set point based upon a configuration of a system in which the processor is included.

In an example, the power controller is to dynamically determine the selected thermal set point based at least in part on a measured temperature of the processor.

In an example, the power controller is to calculate a margin to a throttle temperature based on the measured temperature and a current thermal set point of the processor.

In an example, the power controller is to dynamically adjust the configuration for the processor from a first configuration to a second configuration based on a comparison of the margin to a first threshold.

In an example, when the margin is greater than the first threshold, the power controller is to: determine whether the margin exceeds a headroom value, the headroom value comprising a difference between a first thermal set point associated with the first configuration and a second thermal set point associated with the second configuration; and dynamically reconfigure the processor from the first configuration to the second configuration, where the second configuration has a higher guaranteed operating frequency than the first configuration.

In an example, in response to the margin being less than the first threshold, the power controller is to dynamically reconfigure the processor from a first configuration to a third configuration, the third configuration having a lower guaranteed operating frequency.

In an example, the power controller is to further override a default behavior of a cooling solution coupled to the processor in response to the margin being less than the first threshold.

In an example, firmware is to set a priority order of the plurality of configurations.

In an example, the non-volatile storage comprises: a first entry to store a first configuration of the plurality of configurations, the first configuration including a first guaranteed operating frequency and a first thermal set point; and a second entry to store a second configuration of the plurality of configurations, the second configuration including a second guaranteed operating frequency and a second thermal set point, where the second thermal set point is lower than the first thermal set point and the second guaranteed operating frequency is higher than the first guaranteed operating frequency.

In an example, the power controller is, in response to a measured temperature of the processor being less than the second thermal set point, to cause the at least one core to operate at the second guaranteed operating frequency.

In an example, the processor is to operate with a first guaranteed operating frequency selected by a user based on an indication from the user of a maximum temperate at which the processor is to operate, the maximum temperature less than a first thermal set point associated with the first guaranteed operating frequency.

In an example, the processor is to lock one or more of the plurality of configurations until a customer is permitted to access the one or more of the plurality of configurations.

In another example, a method comprises: operating a processor at a plurality of temperatures each corresponding to one of a plurality of configured maximum temperatures for the processor; identifying, for at least some of the plurality of temperatures, a guaranteed operating frequency for association with at least one of the plurality of configured maximum temperatures for the processor; identifying, for at least one of the plurality of temperatures, a core count value for association with the at least one of the plurality of configured maximum temperatures, the core count value to identify a maximum number of active cores; and storing, in a non-volatile storage of the processor, the plurality of configured maximum temperatures associated with the plurality of guaranteed operating frequencies and the at least one core count value, to enable field configuration of the guaranteed operating frequency based on a selected one of the plurality of configured maximum temperatures for the processor.

In an example, the method further comprises: identifying, for at least some of the plurality of temperatures, a maximum thermal design power for association with the at least one of the plurality of configured maximum temperatures; and storing, in a non-volatile storage of the processor, the plurality of maximum thermal design powers associated with at least some of the plurality of guaranteed operating frequencies.

In an example, the method further comprises: identifying, for at least some of the plurality of temperatures, a maximum current consumption for association with the at least one of the plurality of configured maximum temperatures; and storing, in a non-volatile storage of the processor, the plurality of maximum current consumptions associated with at least some of the plurality of guaranteed operating frequencies.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor including: at least one core to execute instructions; a non-volatile storage to store a plurality of configurations for the processor, the non-volatile storage including a plurality of entries, each of the plurality of entries to store configuration information for the processor for one of the plurality of configurations, the configuration information including at least one of a guaranteed operating frequency and a core count; and a power controller to control the processor to operate at one of the plurality of configurations based at least in part on a selected thermal set point of a plurality of thermal set points of the processor, each of the plurality of thermal set points associated with one of the plurality of configurations. The system may further include a cooling solution coupled to the processor to provide cooling to the processor and a management controller coupled to the processor and the cooling solution, the management controller to control the cooling solution.

In an example, the management controller is to send the selected thermal set point to the processor based upon a configuration of the system, where the system is to operate at a temperature below the selected thermal set point.

In an example, the power controller is to calculate a margin to a throttle temperature based on the measured temperature and a current thermal set point of the processor and dynamically adjust the configuration for the processor from a first configuration to a second configuration based on a comparison of the margin to a first threshold.

In an example, when the margin is less than the first threshold, the power controller is to send a message to the management controller to cause the management controller to override a default behavior of the cooling solution.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    at least one core to execute instructions;
    a non-volatile storage to store a plurality of configurations for the processor including a plurality of entries, each of the plurality of entries to store configuration information for the processor for one of the plurality of configurations, the configuration information including at least one of a guaranteed operating frequency and a core count, at least one of the plurality of entries to store the core count, wherein at least some of the plurality of entries are to store different guaranteed operating frequencies; and
    a power controller to:
        control the processor to operate at one of the plurality of configurations based at least in part on a selected thermal set point of a plurality of thermal set points of the processor, each of the plurality of thermal set points to be associated with one of the plurality of configurations;
        dynamically determine the selected thermal set point based at least in part on a measured temperature of the processor;
        calculate a margin to a throttle temperature based on the measured temperature of the processor and a current thermal set point of the processor;
        determine whether the margin exceeds a headroom value, the headroom value comprising a difference between a first thermal set point associated with a first configuration and a second thermal set point associated with a second configuration, wherein the first thermal set point is the current thermal set point; and
        dynamically reconfigure the processor from the first configuration to the second configuration, wherein the second configuration has a higher guaranteed operating frequency than the first configuration.

2. The processor of claim 1, wherein the power controller is to receive the selected thermal set point from a management controller of a data center, the management controller coupled to the processor, wherein the management controller is to provide the selected thermal set point based upon a configuration of a system in which the processor is included.

3. The processor of claim 1, wherein the measured temperature is one of a measured internal processor temperature and a measured processor case temperature.

4. The processor of claim 1, wherein the power controller is to dynamically adjust a configuration for the processor from the first configuration to a third configuration based on a comparison of the margin to a first threshold, each of the first and third configurations to be one of the plurality of configurations.

5. The processor of claim 1, wherein, in response to the margin being less than a first threshold, the power controller is to dynamically reconfigure the processor from a first configuration to a fourth configuration, the fourth configuration having a lower guaranteed operating frequency, each of the first and third fourth configurations to be one of the plurality of configurations.

6. The processor of claim 5, wherein the power controller is to further override a default behavior of a cooling solution coupled to the processor in response to the margin being less than the first threshold.

7. The processor of claim 1, wherein firmware is to set a priority order of the plurality of configurations.

8. The processor of claim 1, wherein the non-volatile storage comprises:
    a first entry of the plurality of entries to store the first configuration of the plurality of configurations, the first configuration including a first guaranteed operating frequency and a first thermal set point of the plurality of thermal set points; and
    a second entry of the plurality of entries to store the second configuration of the plurality of configurations, the second configuration including a second guaranteed operating frequency and a second thermal set point of the plurality of thermal set points, wherein the second thermal set point is lower than the first thermal set point and the second guaranteed operating frequency is higher than the first guaranteed operating frequency.

9. The processor of claim 8, wherein the power controller is, in response to the measured temperature of the processor being less than the second thermal set point, to cause the at least one core to operate at the second guaranteed operating frequency.

10. The processor of claim 1, wherein the processor is to operate with a first guaranteed operating frequency selected by a user based on an indication from the user of a maximum temperature at which the processor is to operate, the maximum temperature less than the first thermal set point of the plurality of thermal set points associated with a first guaranteed operating frequency.

11. The processor of claim 1, wherein the processor is to lock one or more of the plurality of configurations until a customer is permitted to access the one or more of the plurality of configurations via an unlocking mechanism provided to the customer.

12. A non-transitory machine-readable medium having stored thereon instructions, which if performed by a machine cause the machine to perform a method comprising:
    operating a processor at a plurality of temperatures each corresponding to one of a plurality of configured maximum temperatures for the processor;
    identifying, for at least some of the plurality of temperatures, a guaranteed operating frequency for association with at least one of the plurality of configured maximum temperatures for the processor;
    identifying, for at least one of the plurality of temperatures, a core count value for association with the at least one of the plurality of configured maximum temperatures, the core count value to identify a maximum number of active cores;
    storing, in a non-volatile storage of the processor, the plurality of configured maximum temperatures associated with the plurality of guaranteed operating frequencies and the at least one core count value, to enable field configuration of the guaranteed operating frequency based on a selected one of the plurality of configured maximum temperatures for the processor;

controlling the processor to operate at one of the plurality of configured maximum temperatures based at least in part on a selected thermal set point of a plurality of thermal set points of the processor, each of the plurality of thermal set points to be associated with one of the plurality of configured maximum temperatures;

dynamically determining the selected thermal set point based at least in part on a measured temperature of the processor;

calculating a margin to a throttle temperature based on the measured temperature of the processor and a current thermal set point of the processor;

determining whether the margin exceeds a headroom value, the headroom value comprising a difference between a first thermal set point associated with a first configured maximum temperature and a second thermal set point associated with a second configured maximum temperature, wherein the first thermal set point is the current thermal set point; and dynamically reconfiguring the processor from the first configured maximum temperature to the second configured maximum temperature, wherein the second configured maximum temperature has a higher guaranteed operating frequency than the first configured maximum temperature.

13. The non-transitory machine-readable medium of claim 12, wherein the method further comprises:

identifying, for at least some of the plurality of temperatures, a maximum thermal design power for association with the at least one of the plurality of configured maximum temperatures; and storing, in a non-volatile storage of the processor, the plurality of maximum thermal design powers associated with at least some of the plurality of guaranteed operating frequencies.

14. The non-transitory machine-readable medium of claim 12 wherein the method further comprises:

identifying, for at least some of the plurality of temperatures, a maximum current consumption for association with the at least one of the plurality of configured maximum temperatures; and storing, in a non-volatile storage of the processor, the plurality of maximum current consumptions associated with at least some of the plurality of guaranteed operating frequencies.

15. A system comprising:
a processor including:
at least one core to execute instructions;
a non-volatile storage to store a plurality of configurations for the processor including a plurality of entries, each of the plurality of entries to store configuration information for the processor for one of the plurality of configurations, the configuration information including at least one of a guaranteed operating frequency and a core count, at least one of the plurality of entries to store the core count, wherein at least some of the plurality of entries are to store different guaranteed operating frequencies;
a power controller to:
control the processor to operate at one of the plurality of configurations based at least in part on a selected thermal set point of a plurality of thermal set points of the processor, each of the plurality of thermal set points associated with one of the plurality of configurations;
dynamically determine the selected thermal set point based at least in part on a measured temperature of the processor;
calculate a margin to a throttle temperature based on the measured temperature of the processor and a current thermal set point of the processor;
determine whether the margin exceeds a headroom value, the headroom value comprising a difference between a first thermal set point associated with a first configured maximum temperature and a second thermal set point associated with a second configured maximum temperature, wherein the first thermal set point is the current thermal set point; and
dynamically reconfigure the processor from the first configured maximum temperature to the second configured maximum temperature, wherein the second configured maximum temperature has a higher guaranteed operating frequency than the first configured maximum temperature,
a cooling solution coupled to the processor to provide cooling to the processor; and
a management controller coupled to the processor and the cooling solution, the management controller to control the cooling solution.

16. The system of claim 15, wherein the management controller is to send the selected thermal set point to the processor based upon a configuration of the system, wherein the system is to operate at a temperature below the selected thermal set point.

17. The system of claim 15, wherein the measured temperature is one of a measured internal temperature of the processor and a measured processor case temperature.

18. The system of claim 15, wherein when the margin is less than a first threshold, the power controller is to send a message to the management controller to cause the management controller to override a default behavior of the cooling solution.

19. The system of claim 15 wherein the power controller is to dynamically adjust a configuration for the processor from the first configuration to a third configuration based on a comparison of the margin to a first threshold, each of the first and third configurations to be one of the plurality of configurations.

20. The system of claim 15, wherein, in response to the margin being less than a first threshold, the power controller is to dynamically reconfigure the processor from a first configuration to a fourth configuration, the fourth configuration having a lower guaranteed operating frequency, each of the first and fourth configurations to be one of the plurality of configurations.

\* \* \* \* \*